US012731042B2

(12) United States Patent
Vrselja et al.

(10) Patent No.: US 12,731,042 B2
(45) Date of Patent: Sep. 8, 2026

(54) GRAPH-BASED MACHINE LEARNING FOR ARTIFICIAL BRAIN PERFUSION EXPERIMENTS

(71) Applicant: Bexorg, Inc, New Haven, CT (US)

(72) Inventors: Zvonimir Vrselja, New Haven, CT (US); Dan Liang, New Haven, CT (US); Lucija Barisic, New Haven, CT (US); Shupei Zhang, New Haven, CT (US)

(73) Assignee: Bexorg, Inc., New Haven, CT (US)

( * ) Notice: Subject to any disclaimer, the term of this patent is extended or adjusted under 35 U.S.C. 154(b) by 0 days.

(21) Appl. No.: 19/009,835

(22) Filed: Jan. 3, 2025

(65) Prior Publication Data

US 2025/0225409 A1 Jul. 10, 2025

Related U.S. Application Data

(60) Provisional application No. 63/669,846, filed on Jul. 11, 2024, provisional application No. 63/618,030, filed on Jan. 5, 2024.

(51) Int. Cl.
*G06N 5/02* (2023.01)
*G06N 5/04* (2023.01)

(52) U.S. Cl.
CPC ................. *G06N 5/02* (2013.01); *G06N 5/04* (2013.01)

(58) Field of Classification Search
CPC ................................... G06N 5/02; G06N 5/04
See application file for complete search history.

(56) References Cited

U.S. PATENT DOCUMENTS 11,670,417 B2 6/2023 Banerjee et al.
11,998,001 B2 6/2024 Daniele et al.
2016/0189028 A1* 6/2016 Hu ...................... G06F 3/04842 706/46

(Continued)

OTHER PUBLICATIONS

Vrselja, Zvonimir, et al. "Restoration of brain circulation and cellular functions hours post-mortem." Nature 568.7752 (2019): 336-343. (Year: 2019).*

(Continued)

*Primary Examiner* — Kevin W Figueroa
(74) *Attorney, Agent, or Firm* — Fish & Richardson P.C.

(57) ABSTRACT

Methods, systems, and apparatus, including computer programs encoded on a computer storage medium, for predicting data characterizing a state or biological function of a brain. In one aspect, a method comprises obtaining, for each of a plurality of mammalian brains, respective multi-modal experimental data that characterizes a state of the mammalian brain during or after an artificial perfusion of the mammalian brain by an electromechanical perfusion device; generating a knowledge graph that jointly represents the multi-modal experimental data characterizing the plurality of mammalian brains, the knowledge graph comprising a set of nodes that each represent elements of the multi-modal experimental data and a set of edges that each represent a relationship between a respective pair of nodes; receiving a query from a user; and generating a response to the query based at least in part on the knowledge graph.

20 Claims, 9 Drawing Sheets

(56) References Cited

U.S. PATENT DOCUMENTS

| | | | |
|---|---|---|---|
| 2021/0260226 | A1 | 8/2021 | Sener et al. |
| 2024/0373840 | A1 | 11/2024 | Sestan et al. |

OTHER PUBLICATIONS

Malik, Khalid Mahmood, et al. "Automated domain-specific healthcare knowledge graph curation framework: Subarachnoid hemorrhage as phenotype." Expert Systems with Applications 145 (2020): 113120. (Year: 2020).*

Vlontzos, Athanasios, Daniel Rueckert, and Bernhard Kainz. "A review of causality for learning algorithms in medical image analysis." arXiv preprint arXiv:2206.05498 (2022). Hu et al. US 2016/0189028 (Year: 2022).*

Das, Rajarshi, et al. "Knowledge base question answering by case-based reasoning over subgraphs." International conference on machine learning. PMLR, 2022. (Year: 2022).*

Chen, Yu, Lingfei Wu, and Mohammed J. Zaki. "Toward subgraph-guided knowledge graph question generation with graph neural networks." IEEE Transactions on Neural Networks and Learning Systems 35.9 (2023): 12706-12717. (Year: 2023).*

U.S. Appl. No. 19/070,309, Vrselja, Methods, Systems, and Compositions for Perfusion and Restoration of Organs, filed Mar. 4, 2025, 111 pages.

Vrselja et al., "Restoration of brain circulation and cellular functions hours postmortem" Nature, Apr. 2019, 568(7752): 55 pages.

International Search Report and Written Opinion in International Appln. No. PCT/US2025/010244, mailed on Apr. 1, 2025, 17 pages.

Zhu et al., "Optimization of ssvep-bci virtual reality stereo stimulation parameters based on knowledge graph." Brain Sciences 13.5, Apr. 24, 2023, 710: 14 pages.

Bodewes et al., "Oxygen Transport during Ex Situ Machine Perfusion of Donor Livers Using Red Blood Cells or Artificial Oxygen Carriers", International Journal of Molecular Sciences, vol. 22, No. 1, 235, Dec. 2020, 15 pages.

De Vries et al., "Transplantation of high-risk donor livers after resuscitation and viability assessment using a combined protocol of oxygenated hypothermic, rewarming and normothermic machine perfusion: study protocol for a prospective, single-arm study (DHOPE-COR-NMP trial)." BMJ open 9.8, Aug. 2019, e028596: 1-8.

Hogan et al., "Partial substitution of red blood cells with free hemoglobin solution does not improve maximal O2 uptake of working in situ dog muscle." Oxygen Transport to Tissue XVI. Boston, MA: Springer US, Jan. 1994, 375-378.

Jahr et al., "Does OxyVita, a new-generation hemoglobin-based oxygen carrier, or oxyglobin acutely interfere with coagulation compared with normal saline or 6% hetastarch? An ex vivo thromboelastography study." Journal of cardiothoracic and vascular anesthesia 22.1, Feb. 2008, 34-39.

Marchioro et al., "Extracorporeal perfusion for obtaining postmortem homografts", PMC, May 2011, 1-18.

Neya et al., "Hemoglobin Based Oxygen Carrying Solution Stability in Extracorporeal Circulation an In Vitro Evaluation and Implications for Clinical Use." ASAIO journal 44.3, May 1998, 166-170.

Vekemans et al., "Attempt to rescue discarded human liver grafts by end ischemic hypothermic oxygenated machine perfusion." Transplantation proceedings. vol. 43. No. 9. Elsevier, Nov. 2011, 3455-3459.

* cited by examiner

GRAPH-BASED MACHINE LEARNING FOR ARTIFICIAL BRAIN PERFUSION EXPERIMENTS

CROSS-REFERENCE TO RELATED APPLICATIONS

This application claims the benefit of U.S. Provisional Application Ser. No. 63/618,030, filed Jan. 5, 2024, and U.S. Provisional Application Ser. No. 63/669,846, filed Jul. 11, 2024. The disclosure of the prior applications is considered part of the disclosure of this application is incorporated in its entirety into this application.

TECHNICAL FIELD

This specification relates to generating and using a knowledge graph representing experimental data from artificial perfusion experiments on mammalian brains.

BACKGROUND

Perfusion in mammalian brains refers to the process of delivering perfusate (e.g., blood or an artificial perfusate) to the brain tissue to supply inputs such as, e.g., oxygen, glucose, and nutrients, while removing outputs such as, e.g., carbon dioxide and metabolic wastes. The process of perfusion is facilitated by a dense network of blood vessels, including arteries, capillaries, and veins, which collectively carry the cerebral blood flow (CBF).

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that can predict data characterizing a state or biological function of a brain. In particular, this specification describes a machine learning model that can be trained, at least in part using experimental data collected from a perfusion device, to predict data characterizing a state or biological function of a brain.

The virtual brain system ("system") described in this document receives and stores experimental data derived from artificial perfusion experiments performed on a set of mammalian brains. Each artificial perfusion experiment can involve using an electromechanical perfusion device to perfuse an intact mammalian brain (e.g., that is extracted from a mammal postmortem) by circulating perfusate (e.g., real or artificial blood) through the brain to maintain cellular and molecular function across the brain. One or more drugs can be administered to a brain during an artificial perfusion experiment, e.g., by adding the drug to an arterial input provided to the brain by the perfusion device.

An example of an electromechanical perfusion device is described in: Zvonimir Vrselja et al., "Restoration of brain circulation and cellular functions hours postmortem," *Nature,* 2019 April; 568 (7752), which is incorporated by reference herein.

Examples of electromechanical perfusion devices and artificial perfusion experiments are described in U.S. patent application Ser. No. 16/967,925 and U.S. Patent Application No. 63/562,094, which are incorporated by reference herein.

Throughout this specification, any described machine learning model can be any appropriate type of machine learning model with any appropriate architecture that enables the machine learning model to perform its described functions. For instance, a machine learning model can be implemented as a neural network model, or a random forest model, or a decision tree model, or a support vector machine model, or a linear regression model, and so forth. A machine learning model implemented as a neural network can include any appropriate types of neural network layers (e.g., fully connected layers, attention layers, convolutional layers, recurrent layers, message passing layers, and so forth) in any appropriate number (e.g., 5 layers, 10 layers, or 50 layers) and connected in any appropriate configuration (e.g., as a directed graph of layers).

According to a first aspect there is provided a method performed by one or more computers, comprising: obtaining, for each of a plurality of mammalian brains, respective multi-modal experimental data that characterizes the mammalian brain and that is derived from a respective experiment involving: (i) artificially perfusing the mammalian brain by an electromechanical perfusion device, and (ii) obtaining multi-modal data that characterizes a state of the mammalian brain during or after the artificial perfusion of the mammalian brain by the electromechanical perfusion device; generating a knowledge graph that jointly represents the multi-modal experimental data characterizing the plurality of mammalian brains, wherein: the knowledge graph comprises a set of nodes and a set of edges; the set of nodes comprises a plurality of nodes that each represent elements of the multi-modal experimental data; and each edge connects a respective pair of nodes and represents a relationship between the respective pair of nodes; receiving a query from a user; and generating a response to the query based at least in part on the knowledge graph.

In some implementations, the set of nodes of the knowledge graph comprises one or more nodes that each represent data that characterizes, for each time point in a sequence of one or more time points during artificial perfusion of a respective mammalian brain, a sample from: (i) an arterial input to the mammalian brain at the time point, or (ii) a venous output from the mammalian brain at the time point.

In some implementations, for each time point in the sequence of time points, the data characterizing the sample from: (i) the arterial input to the mammalian brain at the time point, or (ii) the venous output from the mammalian brain at the time point, characterizes a respective concentration of each of one or more substances in the sample at the time point.

In some implementations, the one or more substances comprise one or more of: electrolytes, proteins, metabolites, enzymes, hormones, lipids, nutrients, gases, infectious agents, or drugs.

In some implementations, the set of nodes of the knowledge graph comprises one or more nodes that each represent data that characterizes, for each time point in a sequence of timepoints during artificial perfusion of a respective mammalian brain, a tissue sample extracted from a respective region of the mammalian brain at the time point.

In some implementations, for each time point in the sequence of time points, the data characterizing the tissue sample extracted from the respective region of the mammalian brain at the time point comprises: imaging data generated by imaging the tissue sample using one or more imaging modalities.

In some implementations, the set of nodes of the knowledge graph comprises one or more nodes that each represent data that characterizes a respective concentration of a respective substance in a respective region of a respective mammalian brain at the time point.

In some implementations, the set of nodes of the knowledge graph comprises one or more nodes that each represent time series data that characterizes a respective concentration of a respective substance in a respective region of a respective mammalian brain over a sequence of time points.

In some implementations, the substance is: an electrolyte, or a protein, or a metabolite, or an enzyme, or a hormone, or a lipid, or a nutrient, or a gas, or an infectious agent, or a drug.

In some implementations, the knowledge graph comprises a causal graph; the causal graph comprises a respective set of nodes and a respective set of directed edges; the set of nodes of the causal graph comprises a plurality of nodes that each represent elements of the multi-modal experimental data; and each directed edge of the causal graph connects a respective pair of nodes of the causal graph and represents a causal relationship between the respective pair of nodes of the causal graph.

In some implementations, generating the knowledge graph comprises generating the causal graph by performing operations comprising, for each of one or more pairs of nodes of the causal graph: determining a correlation between the elements of the multi-modal experimental data represented by the pair of nodes of the causal graph; and generating a directed edge of the causal graph that connects the pair of nodes of the causal graph based on the correlation determined between the elements of the multi-modal experimental data represented by the pair of nodes of the causal graph.

In some implementations, each directed edge of the causal graph characterizes a degree of correlation between the elements of the multi-modal experimental data represented by the pair of nodes of the causal graph connected by the edge of the causal graph.

In some implementations, generating the response to the user query based at least in part on the knowledge graph comprises: identifying a sub-graph of the knowledge graph that is relevant to the user query; and generating the response to the user query using the identified sub-graph of the knowledge graph.

In some implementations, identifying the sub-graph of the knowledge graph that is relevant to the user query comprises: determining that each node and edge in the knowledge graph that satisfies a set of criteria defined by the user query is included in the sub-graph.

In some implementations, generating the response to the user query using the identified sub-graph of the knowledge graph comprises: generating a response that identifies some or all of the nodes included in the identified sub-graph.

In some implementations, generating the response to the user query using the identified sub-graph of the knowledge graph comprises: determining one or more statistics of the identified sub-graph of the knowledge graph; and generating the response to the user query based on the statistics of the identified sub-graph of the knowledge graph.

In some implementations, determining one or more statistics of the identified sub-graph of the knowledge graph comprises: determining, for each node included in the identified sub-graph, a number of edges connected to the node; and wherein generating the response to the user query based on the statistics of the identified sub-graph comprises: generating a response to the user query that identifies each node in the identified sub-graph that is connected to less than a threshold number of edges.

In some implementations, the query from the user is a request to perform a prediction task; and generating the response to the query based at least in part on the knowledge graph comprises: performing the prediction task using a graph neural network that has been trained on at least a portion of the knowledge graph.

In some implementations, the graph neural network has been trained on at least the portion of the knowledge graph to perform link prediction; and performing the prediction task using the graph neural network comprises: instantiating a query-specific graph based on the user query; identifying a query-specific pair of nodes in the query-specific graph so that performing the prediction task is equivalent to predicting a likelihood that the query-specific pair of nodes should be connected by an edge in the query-specific graph; and generating, using the graph neural network, a predicted likelihood that the query-specific pair of nodes should be connected by an edge in the query-specific graph.

In some implementations, the graph neural network has been trained on at least the portion of the knowledge graph to predict features associated with nodes; and performing the prediction task using the graph neural network comprises: instantiating a query-specific graph based on the user query; identifying a query-specific node in the query-specific graph so that performing the prediction task is equivalent to predicting a set of one or more features associated with the query-specific node in the query-specific graph; and generating, using the graph neural network, a predicted set of one or more features associated with the query-specific node in the query-specific graph.

In some implementations, the prediction task includes generating a predicted likelihood that a drug will penetrate a blood-brain barrier in a mammalian brain.

In some implementations, the prediction task includes generating a respective predicted concentration of a drug in a region of a mammalian brain at each time point in a sequence of time points following administration of the drug to the mammalian brain.

In some implementations, the prediction task includes predicting a likelihood that a drug, when administered to a mammalian brain, will engage will interact with an intended target in the mammalian brain.

In some implementations, the method further comprises determining, based at least in part on a result of the prediction task, that the drug should be administered to a subject.

In some implementations, the prediction task includes predicting a likelihood that a mammalian brain will become infected within a threshold duration of time during which the mammalian brain is artificially perfused using the electromechanical perfusion device.

In some implementations, the method further comprises determining, based at least in part on a result of the prediction task, that one or more actions should be performed to reduce a likelihood of infection in the mammalian brain.

In some implementations, determining that one or more actions should be performed to reduce a likelihood of infection in the mammalian brain comprises: determining that antibiotics should be administered to the mammalian brain.

In some implementations, the user query identifies a disease and requests data identifying a combination of drugs that are predicted to counteract the disease; and generating the response to the query based at least in part on the knowledge graph comprises: querying the knowledge graph to obtain, for each drug in a collection of drugs, drug pathway data characterizing a change in biochemical state of a mammalian brain resulting from administering the drug to the mammalian brain while the mammalian brain is artificially perfused by the electromechanical perfusion device; querying the knowledge graph to obtain disease pathway data characterizing a change in biochemical state of a mammalian brain resulting from the disease; and identifying the combination of drugs that are predicted to counteract the disease using the drug pathway data and the disease pathway data.

In some implementations, identifying the combination of drugs that are predicted to counteract the disease using the drug pathway data and the disease pathway data comprises: performing a numerical optimization, over a space of combinations of drugs from the collection of drugs, to optimize an objective function that measures, for each combination of drugs, a difference between: (i) the disease pathway, and (ii) a combined drug pathway resulting from combing the drug pathway of each drug in the combination of drugs; and determining, based on a result of the numerical optimization, the combination of drugs that are predicted to counteract the disease.

In some implementations, the method further comprises determining that the identified combination of drugs should be administered to a subject having the disease.

In some implementations, for one or more of the plurality of mammalian brains, artificially perfusing the experimental brain comprises: administering a drug to the mammalian brain as the mammalian brain is being artificially perfused by the electromechanical perfusion device.

In some implementations, for one or more of the plurality of mammalian brains, performing the experiment that generates the multi-modal experimental data that characterizes the mammalian brain further comprises, prior to artificially perfusing the mammalian brain by the electromechanical perfusion device: extracting the mammalian brain from a mammal; and placing the mammalian brain in the electromechanical perfusion device.

In some implementations, the plurality of mammalian brains comprises one or more mammalian brains that each are from a respective mammal that is diagnosed as having a respective disease or disorder.

In some implementations, the disease or disorder is Parkinson's disease, or Alzheimer's disease, or multiple sclerosis, or epilepsy, or stroke, or schizophrenia, or meningitis.

In some implementations, obtaining, for each of the plurality of mammalian brains, respective multi-modal data that characterizes the mammalian brain comprises: performing the experiment on the mammalian brain by: (i) artificially perfusing the mammalian brain by the electromechanical perfusion device, and (ii) obtaining multi-modal data that characterizes the state of the mammalian brain during or after the artificial perfusion of the mammalian brain by the electromechanical perfusion device.

According to another aspect there is provided a method performed by one or more computers, comprising: processing a knowledge graph that jointly represents the multi-modal experimental data characterizing the plurality of mammalian brains to determine a set of experimental parameters for a perfusion experiment on a mammalian brain, wherein the knowledge graph comprises a set of nodes and a set of edges, the set of nodes comprises a plurality of nodes that each represent elements of the multi-modal experimental data, each edge connects a respective pair of nodes and represents a relationship between the respective pair of nodes, and the multi-modal experimental data characterizing the plurality of mammalian brains is derived from respective perfusion experiments on each of the plurality of mammalian brains; artificially perfusing the mammalian brain by an electromechanical perfusion device in accordance with the set of experimental parameters for the perfusion experiment on the mammalian brain; obtaining multi-modal data that characterizes a state of the mammalian brain during or after the artificial perfusion of the mammalian brain by the electromechanical perfusion device; and performing a prediction task by processing some or all of the obtained multi-modal data that characterizes the state of the mammalian brain during or after the artificial perfusion of the mammalian brain by the electromechanical perfusion device.

In some implementations, the method further comprises: updating the knowledge graph to include some or all of the obtained multi-modal data that characterizes the state of the mammalian brain during or after the artificial perfusion of the mammalian brain by the electromechanical perfusion device.

In some implementations, performing the prediction task by processing some or all of the obtained multi-modal data that characterizes the state of the mammalian brain during or after the artificial perfusion of the mammalian brain by the electromechanical perfusion device comprises: performing the prediction task by processing the updated knowledge graph.

In some implementations, processing the knowledge graph to determine the set of experimental parameters for the mammalian brain comprises: obtaining a query that represents a request to determine the set of experimental parameters for the mammalian brain; and generating a response to the query based at least in part on the knowledge graph to determine the set of experimental parameters for the mammalian brain.

In some implementations, obtaining the query that represents the request to determine the set of experimental parameters for the mammalian brain comprises: receiving the query from a user.

In some implementations, obtaining multi-modal experimental data for the mammalian brain further comprises, while artificially perfusing the mammalian brain: determining an updated set of experimental parameters for the mammalian brain by processing: (i) the knowledge graph and (ii) multi-modal data that characterizes the state of the mammalian brain during the artificial perfusion of the mammalian brain by the electromechanical perfusion device; and artificially perfusing the mammalian brain by the electromechanical perfusion device in accordance with the updated set of experimental parameters for the mammalian brain.

According to another aspect there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

An artificial perfusion experiment on a brain can yield rich, multi-modal data characterizing the state of the brain (and in particular, the effect of a drug on the brain) during or after the perfusion experiment. The data can be resolved temporally (e.g., where data characterizing the state of the brain is captured at each time point in a sequence of time points during the artificial perfusion), or resolved spatially (e.g., where data characterizing each of multiple brain regions is captured as part of the perfusion experiment), or both. The multi-modal data can be obtained by analyzing (e.g., performing assays, imaging, spectroscopy, gene sequencing, cytokine analysis, anti-body analysis, genomic analysis, transcriptomic analysis, proteomic analysis, metabolomic analysis, etc.) of samples (e.g., of arterial input perfusate, venous output perfusate, brain tissue, substances in the brain, etc.) obtained from various regions of the brain over time.

By directly collecting samples using deceased brains and emulating biological functions of living brains, artificial perfusion experiments can yield data that would otherwise only be accessible by collecting samples from living brains and would therefore be limited in scope so as to prevent killing or damaging the living brains. Compared to conventional methods of data collection and experimentation, such as computational modeling of processes within living brains and experimentation with brains from analogue species, artificial perfusion experiments can therefore yield more accurate and unbiased experimental data for predicting and modeling biological processes within living brains.

Artificial perfusion experiments can provide uniquely rich and informative data sets, e.g., for precisely characterizing and understanding the effects of drugs on brains. However, the quantity and nature of the data generated by artificial perfusion experiments can raise significant technical challenges. First, efficiently storing and querying artificial perfusion experiment data can become challenging because very large quantities of data can be generated, e.g., as high-dimensional datasets of observations are acquired across large numbers of artificial perfusion experiments. Second, the artificial perfusion experiment data can be highly heterogeneous as it can be acquired by way of several diverse modalities and assays. For instance, the data can include scalar data, time series data, imaging data, and so forth. Running conventional machine learning models on the artificial perfusion experiment data can therefore be challenging, because doing so may require carefully aligning data captured from different modalities and devising specific model architectures suitable for processing data from various combinations of modalities.

The system described in this specification can address these challenges by constructing a knowledge graph representing the artificial perfusion experiment data. The knowledge graph includes a set of nodes (including multiple nodes that each represent respective aspects of the experiment data) and a set of edges (that each connect a respective pair of nodes and represent a relationship between the pair of nodes). Nodes in the knowledge graph can represent data across different artificial perfusion experiments and at multiple levels of resolution. For instance, one node may be associated with a single scalar value characterizing a concentration measurement of one substance at one time point in one region of the brain, while another node may be associated time series data representing concentration measurements of the substance over a sequence of time points and in multiple brain regions.

The system can query the knowledge graph, using graph querying algorithms, to quickly and efficiently retrieve data relevant to user requests, even as the amount of data represented by the knowledge graph increases as more artificial perfusion experiments are performed and new data modalities are captured. Further, instead of hand-crafting individual machine learning models to perform prediction tasks on the artificial perfusion experiment data, the system can leverage the knowledge graph to train a graph neural network that can act as a "generalist" model. More specifically, the graph neural network can be trained on the knowledge graph, e.g., to perform tasks such as link prediction (e.g., predicting the likelihood that edges should exist between pairs of nodes) or node prediction (e.g., predicting feature sets associated with nodes). For any particular prediction task, the system can express the prediction task as a link prediction or node prediction for a particular graph, and then use the graph neural network to perform the link prediction or node prediction and thus solve the original prediction task. The graph neural network does not require any explicit alignment of multi-modal data and can readily accommodate the inclusion of data from new experiments and/or new modalities in the knowledge graph.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
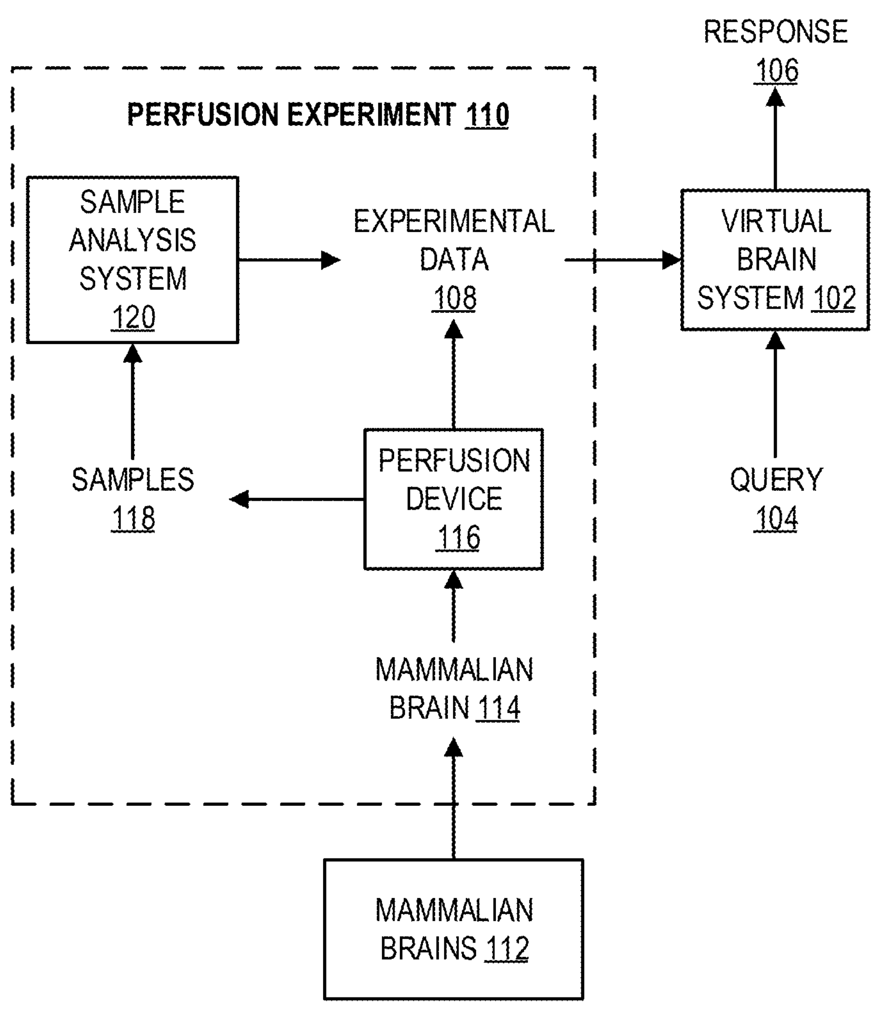
FIG. 1 is a block diagram illustrating an environment that includes a virtual brain system.

FIG. 1 is a block diagram illustrating an environment that includes a virtual brain system 102. The virtual brain system 102 is an example of a system implemented as computer programs on one or more computers in one or more locations in which the systems, components, and techniques described below are implemented.

The virtual brain system 102 can receive a query 104 from a user and can generate a response 106 to the query 104. The query 104 from the user can be a request to perform a prediction task and the response 106 can be the results of the virtual brain system performing the prediction task. In particular, the query 104 can include input data that characterizes a mammalian brain and the system 102 can process the input data and produce predictions of a state or function of the mammalian brain.

For example, the virtual brain system 102 can process input data characterizing the administration of a drug to the brain (e.g., as ingested or administered by IV) and can predict a response of the brain to the drug. As a further example, the virtual brain system 102 can process input data characterizing a chemical composition of the administered drug, a blood concentration of the administered drug over time, etc. as part of predicting the response of the brain to the drug. As a further example, the virtual brain system 102 can process input data characterizing the brain (e.g., gene sequencing of the brain, data specifying diseases afflicting the brain, etc.) as part of characterizing the response of the brain to the drug. The virtual brain system 102 can predict, e.g., a metabolic pathway of the drug in the brain, an activation or a deactivation of certain gene pathways in the brain, physiological changes to the brain (e.g., swelling, tissue damage, etc.), etc., relating to the administration of the drug.

As another example, the virtual brain system 102 can process input data characterizing an exposure of the brain to an infectious agent (e.g., a virus, bacteria, etc.) can predict a response of the brain to the infectious agent. As a further example, the virtual brain system 102 can process input data characterizing the infectious agent, e.g., data characterizing physical properties of the infectious agent, gene sequencing data of the infectious agent, etc., as part of predicting the response of the brain to the infectious agent. The virtual brain system 102 can predict, e.g., a metabolic change in the brain, an activation or a deactivation of certain gene pathways in the brain, physiological changes to the brain (e.g., swelling, tissue damage, etc.), etc., resulting from exposure to the infectious agent.

The virtual brain system 102 is explained in more detail below with reference to FIG. 2 and FIG. 3 below.

To respond to the query 104, the virtual brain system 102 can process experimental data 108 obtained from perfusion experiments 110 on a set of mammalian brains 112. For each perfusion experiment 110, perfusate (e.g., real blood, artificial blood, etc.) is circulated through a mammalian brain 114 to collect experimental data 108 characterizing the mammalian brain 114 throughout the perfusion experiment 110. For example, the perfusion experiment 110 can collect experimental data 108 characterizing the response of the mammalian brain 114 to a particular drug. As another example, the perfusion experiment 110 can collect experimental data 108 characterizing the response of a mammalian brain to a particular infectious agent. Each perfusion experiment 110 is performed using an electromechanical perfusion device 116, which can control and monitor the progress of a perfusion experiment 110 for a mammalian brain 114.

The perfusion device 116 can perform perfusion experiments 110 using a set of mammalian brains 112 and can collect experimental data 108 that characterizes mammalian brains 114 during the perfusion experiments 110. The perfusion device 116 can circulate perfusate through the mammalian brains 114 to physically emulate functions of the mammalian brains 114 within a body. The perfusion device 116 can control characteristics of the perfusate circulated through the mammalian brains 114 to maintain functions of the mammalian brains 114 (e.g., cellular metabolism, processes of the blood brain barrier, etc.). As an example, the perfusion device 116 can control the temperature, pressure, flow rate, oxygen saturation, etc., of the perfusate.

As another example, the perfusion device 116 can control quantities of substances (e.g., electrolytes, proteins, metabolites, enzymes, hormones, lipids, nutrients, gases, infectious agents, drugs, etc.) within the perfusate. For example, the perfusion device 116 can control a concentration of a drug within the perfusate. As a particular example, the perfusion device can control the concentration of a drug within the perfusate to emulate the administration of the drug (e.g., to emulate oral administration, IV administration, etc.). As another example, the perfusion device 116 can control the concentration of an infectious agent (e.g., a bacteria, a virus, etc.) to emulate exposure of the mammalian brains 114 to the infectious agent.

During a perfusion experiment 110 for a given mammalian brain 114, the perfusion device 116 can circulate perfusate through the given mammalian brain 114 and can collect experimental data 108 characterizing the given mammalian brain 114. The perfusion device 116 can control the composition and properties of an arterial input flow of perfusate into the given mammalian brain 114 and can collect and analyze perfusate from a venous output flow from the given mammalian brain 114 during the perfusion experiment 110. The perfusion device 116 can include instruments to monitor the mammalian brain 114 or fluids from the mammalian brain 114 during the perfusion experiments 110. For example, the perfusion device 116 can include a spectrometer (e.g., a Raman spectrometer) to record spectra from tissue, arterial input perfusate, and venous output perfusate obtained from the mammalian brains 114 during the perfusion experiments 110.

The perfusion experiment 110 can include a sample analysis system 120 that can perform a variety of analyses of the samples 118 from the mammalian brain 114 obtained during or after the perfusion experiment 110. As an example, the sample analysis system 120 can perform assays of the samples 118 to generate experimental data 108. As further examples, the sample analysis system 120 can perform spectroscopy, gene sequencing, cytokine analysis, anti-body analysis, genomic analysis, transcriptomic analysis, protcomic analysis, metabolomic analysis, etc., of the samples 118. As another example, the sample analysis system 120 can perform imaging using, e.g., a microscope or other imaging device (e.g., an X-ray machine, an MRI scan machine, a CT scan machine, a PET scan machine, etc.), of the samples 118 or of the mammalian brain 114.

The experimental data 108 for a given perfusion experiment 110 can include any of a variety of data characterizing the circulation of perfusate through the mammalian brain 114 during the given perfusion experiment 110. For example, the experimental data 108 can include data characterizing a temperature, pressure, flow rate, oxygen saturation, etc., of the arterial input flow or the venous output flow of perfusate during the perfusion experiment 110. As another example, the experimental data 108 can include spectra obtained from spectroscopy of the arterial input flow arterial input flow or the venous output flow of perfusate during the perfusion experiment 110. As another example, the experimental data 108 can include data characterizing the concentration of a drug, an infectious agent, and so on within the arterial input flow of perfusate during the perfusion experiment 110.

The experimental data 108 for a given perfusion experiment 110 can include any of a variety of data characterizing analyses of samples 118 obtained from the mammalian brain 114 during the perfusion experiment. The experimental data 108 can, for example, include data characterizing analyses of samples 118 of perfusate, brain tissue, cerebrospinal fluid (CSF), etc., obtained during the perfusion experiment 108. The samples 118 can include samples obtained from particular locations in the mammalian brain 114 at particular times during the perfusion experiment 110. As an example, the experimental data 108 can include spectra obtained from spectroscopy (e.g., Raman spectroscopy, mass spectroscopy, etc.) of the samples 118 obtained during the perfusion experiment 110. As another example, the experimental data 108 can include the results of lab analysis of the samples 118 obtained during the perfusion experiment 110. For example, the experimental data 108 can include the results of genomic, transcriptomic, proteomic, metabolomic, etc., analyses of the samples 118 obtained during the perfusion experiment 110. As a particular example, the experimental data 108 can include the results of quantitative polymerase chain reaction (qPCR) analyses of the samples 118 obtained during the perfusion experiment 110. As another example, the experimental data 108 can include the results of antibody analysis of the samples 118 obtained during the perfusion experiment 110. As another example, the experimental data 108 can include the results of cytokine analysis of the samples 118 obtained during the perfusion experiment 108.

The experimental data 108 for a given perfusion experiment 110 can include data characterizing images obtained of the mammalian brain 114 or of samples 118 from the mammalian brain 114 during the perfusion experiment 110. For example, the experimental data 108 can include images of the mammalian brain 114 or images of samples 118 from the mammalian brain 114 as exposed to, e.g., a dye, a stain, a fluorescently labeled protein, and so on. As another example, the experimental data 108 can include medical imaging results of the mammalian brain 114 (e.g., results from an MRI scan, a CT scan, a PET scan, etc. of the mammalian brain 114).

The experimental data 108 for a given perfusion experiment 110 can include data characterizing the mammalian brain 114 used for the perfusion experiment 108. As an example, the experimental data 108 can include data characterizing a type of mammalian brain 114 (e.g., a pig brain, a human brain, etc.) or demographic information for the mammalian brain 114 (e.g., an age for the brain, etc.). As another example, the experimental data 108 can include the results of gene sequencing of the mammalian brain 114 used for the perfusion experiment 110. The experimental data 108 can include categorical classifications of the mammalian brain 114 used for the perfusion experiment 110. As an example, the experimental data 108 can include a classification that identifies a particular gene group for the mammalian brain 114 used in the perfusion experiment 110. As another example, the experimental data 108 can include a classification that identifies the mammalian brain 114 used in the perfusion experiment 110 as being inflicted with a particular condition (e.g., Parkinson's disease, Alzheimer's disease, etc.).

The experimental data 108 for a given perfusion experiment 110 can include data characterizing results of the perfusion experiment 110. As an example, the experimental data 108 can include a categorical classification of a response of the mammalian brain 114 to the perfusion experiment 110 (e.g., that the brain absorbed a drug to a certain threshold amount, that a threshold level of an infectious agent was present in the brain, etc.). The experimental data 108 can include data characterizing physiological changes in the mammalian brain 114 as a result of the perfusion experiment 110. For example, the experimental data 108 can characterize swelling, tissue damage, etc. in the mammalian brain 114 as a result of the perfusion experiment 108.

Figure 2:
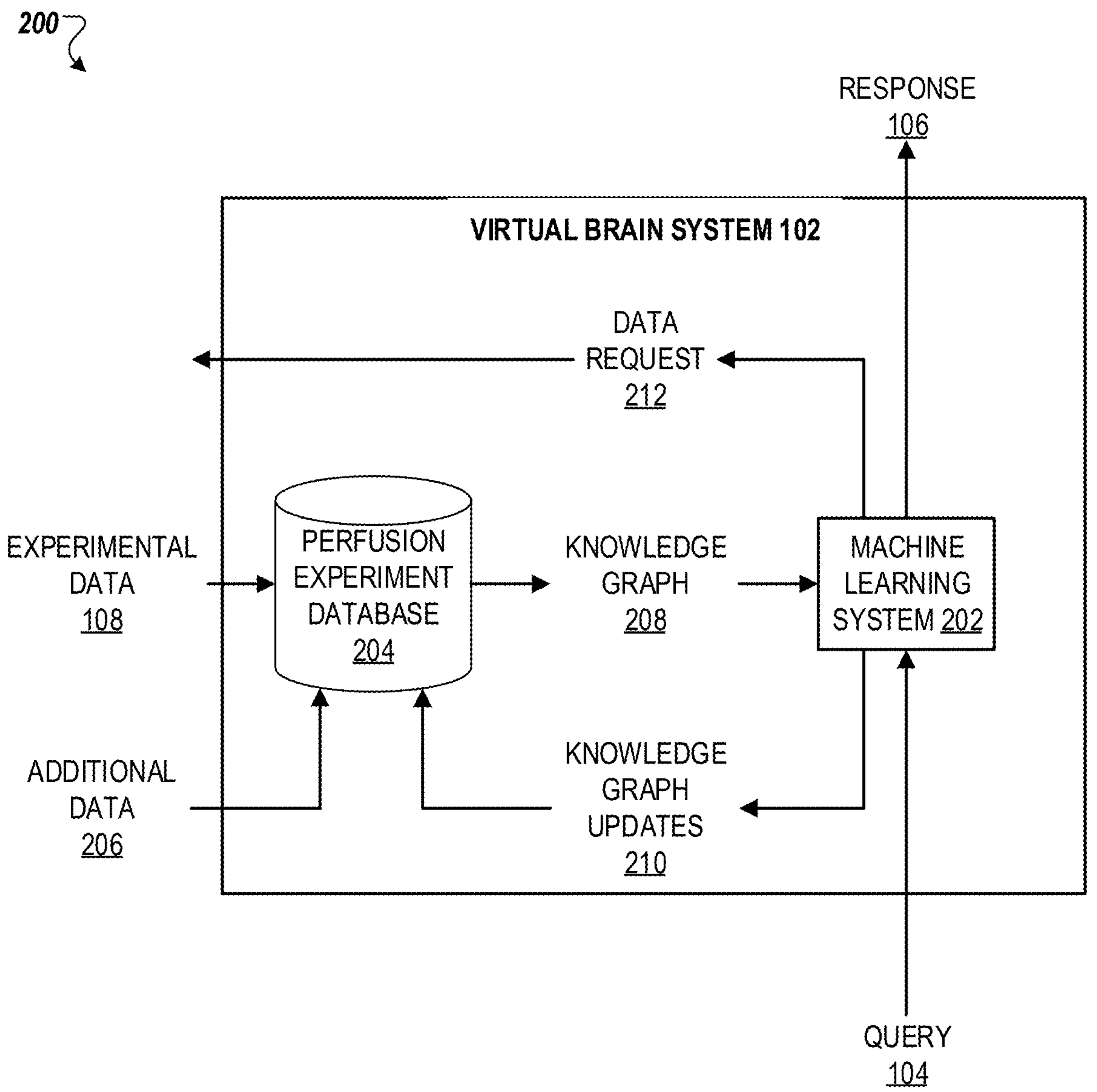
FIG. 2 is a block diagram of an example virtual brain system.

FIG. 2 is a block diagram of an example virtual brain system 102. The virtual brain system 102 is an example of a system implemented as computer programs on one or more computers in one or more locations in which the systems, components, and techniques described below are implemented.

As described above, the virtual brain system 102 can receive and process a query 104 from a user and generate a response 106 to the query 104. The query 104 can be a request for the system 102 to perform a prediction task and the response 106 can be a prediction regarding a mammalian brain.

As part of generating the response 106, the virtual brain system 102 can receive and process experimental data 108 from perfusion experiments on a set of mammalian brains. Each perfusion experiment involves performing an artificial perfusion of a mammalian brain from the set of brains using an electromechanical perfusion device. In general, the experimental data 108 characterizes states and responses of the mammalian brains during the perfusion experiments.

The virtual brain system 102 includes a machine learning system 202 and a perfusion experiment database 204. The machine learning system 202 can process the query 104 to generate the response 106. As part of generating the response 106, the machine learning system 202 can retrieve data stored within the perfusion experiment database 204. The machine learning system 202 can include one or more predictive machine learning models trained using data stored within the perfusion experiment database 204.

The perfusion experiment database 204 can have any structure appropriate for storing the experimental data 108 from the perfusion experiments. As an example, the perfusion experiment database 204 can be a relational database. As another example, in some implementations, the perfusion experiment database 204 can be a graph database that includes nodes and edges to represent information from the perfusion experiments.

The perfusion experiment database 204 can store data characterizing any of a variety of experimental details for the perfusion experiments. For example, the perfusion experiment database 204 can store data specifying equipment (e.g., perfusion devices, medical imaging systems, etc.) used or available for perfusion experiments.

The perfusion experiment database 204 can store additional data 206. For example, the database 204 can store outputs (e.g., predictions, classifications, transformed data, etc.) generated by the machine learning system 202. As another example, the database 204 can store additional data provided by a user of the virtual brain system 102. As another example, the database 204 can store data retrieved from external databases. As particular examples, the virtual brain system can store data characterizing chemical compositions of drugs, pharmacological results, pharmacokinetic properties of drugs, gene sequencing results, genomic analyses, transcriptomic analyses, proteomic analyses, metabolomic analyses, etc., retrieved from external databases.

The perfusion experiment database 204 can store data defining a knowledge graph 208. The knowledge graph 208 can include nodes of any of a variety of types to represent the data stored within the perfusion experiment database 204. As examples, the knowledge graph 208 can include node types to represent, e.g., a drug, phenotype, a pathway, a gene, a mammalian brain, a perfusion device, an OS version used in a perfusion experiment, a disease, an anatomical region of the brain, a kind of assay, and so on. The knowledge graph 208 can include edges of any of a variety of types to represent relationships among the data stored within the perfusion experiment database 204. As examples, the perfusion experiment database 204 can include edge types to represent, e.g., a disease-drug interaction, a relationship between a disease and a phenotype, a disease and exposure experiment, a perfusion experiment using a perfusion device and the OS version used on the perfusion device, and so on.

In some implementations, the knowledge graph 208 can include one or more causal graphs (e.g., causal sub-graphs). Each causal graph can include a respective set of nodes (e.g., representing respective elements of the data stored within the perfusion experiment database 204, such as respective drugs, phenotypes, genes, diseases, molecule concentrations, infectious agent concentrations, brain states, etc.) and a respective set of directed edges for the causal graph (e.g., representing respective causal relationships between elements of the data stored within the perfusion experiment database 204). Generating the causal graphs is described in more detail below with reference to FIG. 3.

The machine learning system 202 can perform any of a variety of operations involving the knowledge graph 208 as part of generating the response 106. For example, the machine learning system 202 can process data stored within the perfusion experiment database 204 (e.g., as represented by the knowledge graph 208) to generate updates 210 (e.g., adding nodes, adding edges, generating processed representations of the experimental data, etc.) for the knowledge graph 208. As a particular example, the machine learning system 202 can process data stored within the perfusion experiment database 204 as part of creating the knowledge graph 208. As another example, the machine learning system 202 can process the knowledge graph 208 as part of generating the response 106.

In general, the predictive machine learning models can process any of a variety of data from the perfusion experiment database 204 to generate the predictions. For example, the predictive machine learning models can generate the predictions based on, e.g., chemical compositions of drugs, gene sequences for brains and infectious agents, pharmacokinetic data, etc., stored in the perfusion experiment database 204. As another example, the predictive machine learning models can generate the predictions based on experimental data 108 collected from perfusion experiments.

In general, the predictive machine learning models can predict any of a variety of types of data stored within the perfusion experiment database 204. For example, the predictive machine learning models can predict, e.g., physiological, chemical, metabolic, gene pathway, etc. changes within a brain (e.g., as resulting from a perfusion experiment). As another example, the predictive machine learning models can predict compound (e.g., a chemical, drug, protein, infectious agent, etc.) absorption and creation within a brain. As particular examples, the predictive machine learning models can predict rates of absorption and creation for a compound in the brain (e.g., as resulting from a perfusion experiment). As another particular example, the predictive machine learning models can predict spatial distributions of an absorption and creation of a compound in the brain (e.g., as resulting from a perfusion experiment). As another example, the predictive machine learning model can predict the activity of particular gene pathways within a brain.

The predictive machine learning models of the machine learning system 202 can have any architecture suited to processing or predicting experimental data 108 from the perfusion experiment database 204. For example, the predictive machine learning models of the machine learning system 202 can include, e.g., random forest models, support vector machines, regression models (e.g., linear regression models, non-linear regression models, etc.), and so on. In particular, the predictive machine learning models can be neural networks. As an example, when the experimental data includes time series data (e.g., dosages of administered drugs over time, concentrations of metabolic products over time, etc.), the predictive machine learning models can include neural networks suited to processing or predicting time series data (e.g., recurrent neural networks, transformer models, etc.). As another example, when the experimental data includes image data (e.g., medical images of the brain, results from dying or staining tissues of the brain, spatial concentrations of a chemical in the brain, etc.), the predictive machine learning models can include neural networks suited to processing or predicting image data (e.g., convolutional neural networks, visual transformer models, etc.).

As a particular example, the predictive machine learning models can include graph neural networks. As an example, when the perfusion experiment database 204 is a graph database, the predictive machine learning models can include graph neural networks that can predict nodes, edges, subgraphs, or partitions for the perfusion experiment database 204. As another example, the predictive machine learning models can include graph neural networks that can predict nodes, edges, subgraphs, or partitions for the knowledge graph 208.

The machine learning system 202 can include a generalist graph neural network that can process the knowledge graph 208 and the query 104 to generate the response 106. The generalist graph neural network can be trained using data from the perfusion experiment database 204. As an example, the generalist graph neural network can be trained using a set of training data that includes example data represented by the knowledge graph 208, example queries, and target responses for the example queries.

The generalist graph neural network can perform any of a variety of operations to generate the responses 106. In general, the generalist graph neural network can process the query 104, retrieve data represented by the knowledge graph 208, and process the data to generate the response 106. As an example, the generalist graph neural network can process the data represented by the knowledge graph 208 by providing the data to other (e.g., specialist) predictive machine learning models of the machine learning system 202 and further processing the outputs from the other machine learning models. As another example, the generalist graph neural network can directly (e.g., without using other machine learning models) perform graph operations to process the data represented by the knowledge graph 208. Example graph operations that can be performed by generalist graph neural network to generate the response 106 using the knowledge graph 208 are explained in more detail below with reference to FIG. 4.

In some implementations, the virtual brain system 102 can identify that additional information is required to generate the response 106. For example, the virtual brain system 102 may determine uncertainties for certain predictions and can identify that additional information is required based on the uncertainties exceeding a particular uncertainty threshold. As another example, the virtual brain system 102 may determine that additional data should be added to the perfusion experiment database 204. For example, the virtual brain system 102 may determine that data regarding perfusion experiments using a certain type of drug, using a certain classification of brain, under certain conditions, should be added to the perfusion experiment database.

When the virtual brain system 102 identifies that additional information is required to generate certain predictions, the virtual brain system 102 can produce requests 212 for the additional information. As an example, the virtual brain system 102 can identify additional information 206 to add to the perfusion experiment database 204 and can query the additional information 206 from the external databases. As another example, the virtual brain system 102 can identity additional information 206 to add to the perfusion experiment database 204 and can determine and output specifications for perfusion experiments that can be used to obtain the additional information 206 for the perfusion experiment database 204.

Figure 3:
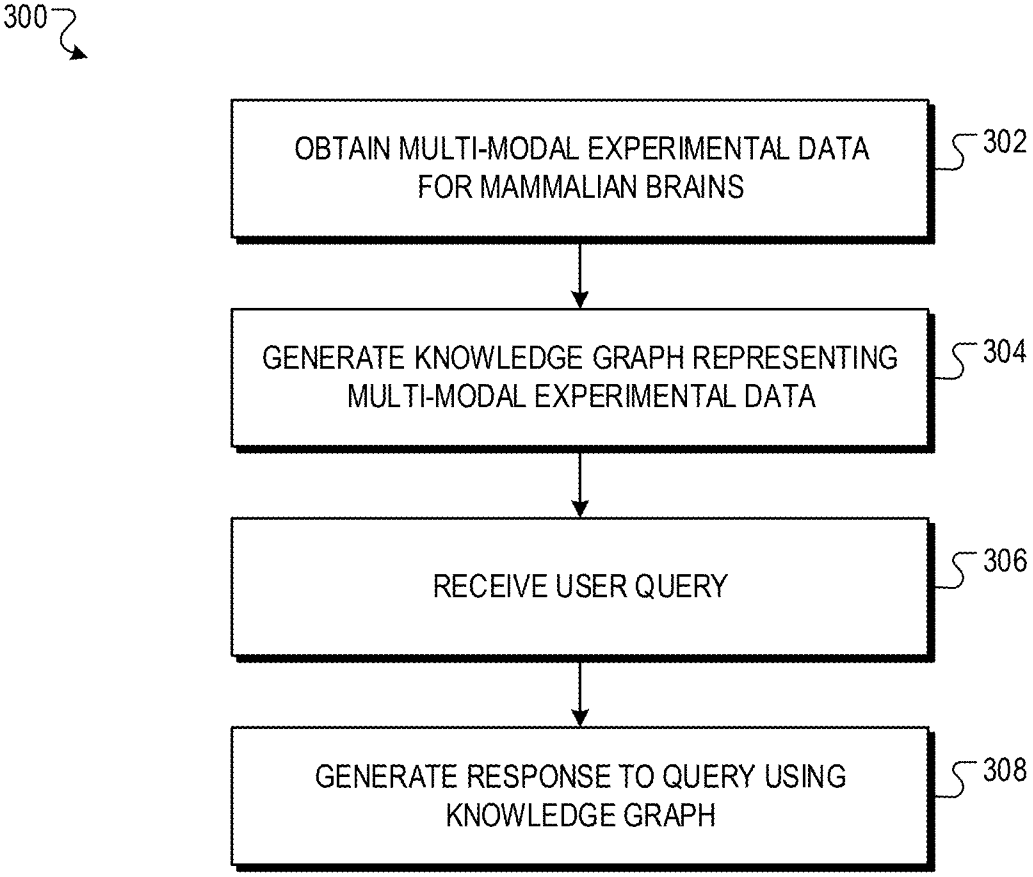
FIG. 3 is a flow diagram of an example process for creating and querying a knowledge graph for artificial perfusion experiment data.

FIG. 3 is a flow diagram of an example process for creating and querying a knowledge graph for artificial perfusion experiment data. For convenience, the process 300 will be described as being performed by a system of one or more computers located in one or more locations. For example, a virtual brain system, e.g., the virtual system 102 of FIG. 1, appropriately programmed in accordance with this specification, can perform the process 300.

For each of the set of mammalian brains, the system can obtain respective multi-modal experimental data (step 302). The system can obtain the experimental data for the mammalian brains from artificial perfusion experiments of the brains. As described above, an artificial perfusion experiment for a mammalian brain involves (i) artificially perfusing the mammalian brain using an electromechanical perfusion device and (ii) obtaining multi-modal data that characterizes a state of the mammalian brain during or after the artificial perfusion of the mammalian brain by the electromechanical perfusion device.

The system can generate a knowledge graph that jointly represents the multi-modal experimental data characterizing the plurality of mammalian brains (step 304). In particular, as part of generating the knowledge graph, the system can store the experimental data within a perfusion experiment database (e.g., a graph database).

The knowledge graph includes a set of nodes and a set of edges between the nodes. Each node of the set of nodes can represent one or more elements of the multi-modal experimental data. Each edge of the set of edges connects a particular pair of nodes and represents a relationship between the particular pair of nodes.

As an example, the knowledge graph can include nodes that each represent data that characterizes, for each time point in a sequence of one or more time points during artificial perfusion of a respective mammalian brain, a sample from: (i) an arterial input to the mammalian brain at the time point, or (ii) a venous output from the mammalian brain at the time point. The data characterizing the sample at each time point can characterize a respective concentration of each of one or more substances (e.g., electrolytes, proteins, metabolites, enzymes, hormones, lipids, nutrients, gases, infectious agents, drugs, etc.) in the sample at the time point.

As another example, the knowledge graph can include nodes that each represent data that characterizes, for each time point in a sequence of timepoints during artificial perfusion of a respective mammalian brain, a tissue sample extracted from a respective region of the mammalian brain at the time point. The data characterizing the tissue sample extracted from the respective region of the mammalian brain at each time point can include imaging data generated by imaging the tissue sample using one or more imaging modalities.

As another example, the knowledge graph can include nodes that each represent data that characterizes a respective concentration of a respective substance (e.g., an electrolyte, or a protein, or a metabolite, or an enzyme, or a hormone, or a lipid, or a nutrient, or a gas, or an infectious agent, drug, etc.) in a respective region of a respective mammalian brain at the time point. The knowledge graph can include nodes that each represent time series data that characterizes a respective concentration of a respective substance (e.g., an electrolyte, or a protein, or a metabolite, or an enzyme, or a hormone, or a lipid, or a nutrient, or a gas, or an infectious agent, drug, etc.) in a respective region of a respective mammalian brain over a sequence of time points.

As another example, in some implementations, the knowledge graph can include one or more causal graphs (e.g., causal sub-graphs). Each causal graph can include a respective set of nodes and a respective set of directed edges for the causal graph. For each causal graph, each node of the causal graph can represent a respective element of the data stored within the perfusion experiment database, (e.g., a drug, phenotype, a gene, a disease, a molecule concentration, an infectious agent concentration, a state of a brain, and so on). For each causal graph, each directed edge of the causal graph can connect a respective pair of nodes of the causal graph and represents a causal relationship between the respective pair of nodes of the causal graph. Each directed edge of a causal graph can characterize a degree of correlation between the elements of experimental data represented by the nodes connected by the edge. For example, a directed edge from a first node to a second node can represent the first node causing the second node, the first node affecting the second node, the first node preventing the second node, and so on by characterizing degrees of correlation between elements of experimental data represented by the first and second nodes.

For example, a causal graph can include directed edges representing, e.g., causal relationships between the administration of a drug to a brain and changes to molecule concentration in the brain, changes to infectious agent concentrations in the brain, changes to a state of the brain (e.g., an amount of swelling of the brain), and so on. As another example, a causal graph can include directed edges representing, e.g., causal relationships between the presence of an infectious agent or a disease in a brain and changes to molecule concentration in the brain, changes to molecule concentrations in the brain, changes to infectious agent concentrations in the brain, changes to a state of the brain (e.g., an amount of swelling of the brain), and so on. As another example, a causal graph can include directed edges representing, e.g., causal relationships between the presence or activation of a gene in a brain and the presence of a disease or infectious agent in the brain, changes to molecule concentration in the brain, changes to molecule concentrations in the brain, changes to infectious agent concentrations in the brain, changes to a state of the brain (e.g., an amount of swelling of the brain), and so on.

The system can generate and include the causal graphs within the knowledge graph by processing the experimental data stored within the perfusion experiment database. For example, for each pair of nodes of a causal graph, the system can process the experimental data stored within the perfusion experiment database to determine a correlation between the elements of experimental data represented by the pair of nodes and can generate a directed edge of the causal graph that connecting the pair of nodes based on the correlation determined for the pair of nodes. In some implementations, the system can generate the directed edges of a causal graph by determining respective correlations for each pair of nodes of the causal graph and by processing the determined correlations among the nodes of the causal graph using a statistical causal inference technique to evaluate causal relationships among the nodes of the causal graph. Some examples of statistical causal inference techniques are described by Heise, David R. *Causal Analysis*. John Wiley & Sons, 1975 and Finkel, Steven E. *Causal Analysis with Panel Data*. Sage, 1995.

In general, each node of a causal graph can represent experimental data stored within the perfusion experiment data for a plurality of perfusion experiments (e.g., a drug concentration, a presence of a phenotype, a presence of gene, a presence of a disease, a molecule concentration, an infectious agent concentration, a brain state, and so on for the plurality of perfusion experiments). Each node of the causal graph can be associated with corresponding experimental data stored within the perfusion experiment data for each of the plurality of perfusion experiments for the node (e.g., corresponding drug concentrations, phenotype presences, gene presences, disease presences, molecule concentrations, infectious agent concentrations, brain states, and so on for each the plurality of perfusion experiments). The system can determine the correlation between a pair of nodes of a causal graph by evaluating a correlation between the experimental data represented by the pair of nodes across a shared set of perfusion experiments for the pair of nodes.

The system can receive a query from a user (step 306). The query can be a request to perform a prediction task. For example, the prediction task can include generating a predicted likelihood that a drug will penetrate a blood-brain barrier in a mammalian brain. As another example, the prediction task can include generating a respective predicted concentration of a drug in a region of a mammalian brain at each time point in a sequence of time points following administration of the drug to the mammalian brain. As another example, the prediction task can include predicting a likelihood that a drug, when administered to a mammalian brain, will engage will interact with an intended target in the mammalian brain. As another example, the prediction task can include predicting a likelihood that a mammalian brain will become infected within a threshold duration of time during which the mammalian brain is artificially perfused using the electromechanical perfusion device. As another example, the prediction task can include predicting causal relationships among elements of experimental data (e.g., causal relationships between drug concentrations, phenotype presences, gene presences, disease presences, molecule concentrations, infectious agent concentrations, brain states, and so on). As another example, the user query can represent a request to determine a set of experimental parameters for a perfusion experiment on a mammalian brain, e.g., to obtain particular experimental data characterizing the mammalian brain, to determine a particular causal relationship, and so on.

The system can generate a response to the query based, at least in part, on the knowledge graph (step 308). When the system performs a requested prediction task, the response can include results from the prediction task and can be based on results from the prediction task. For example, the system can determine, based at least in part on a result of the prediction task, and include within the response whether a drug should be administered to a subject. As another example, the system can determine, based at least in part on a result of the prediction task, and include within the response that one or more actions should be performed to reduce a likelihood of infection in the mammalian brain. As a particular example, the system can determine and include within the response whether antibiotics should be administered to the mammalian brain to reduce a likelihood of infection in the mammalian brain.

Figure 4:
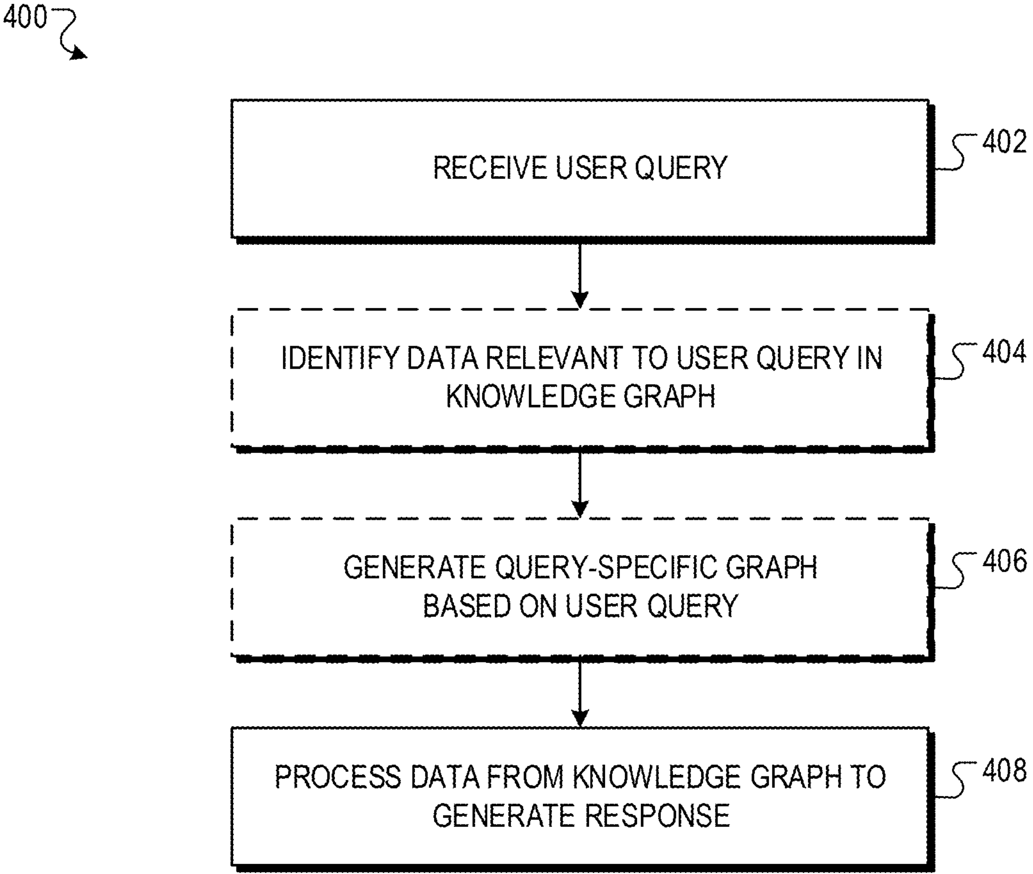
FIG. 4 is a flow diagram of an example process for generating a response to a user query using a knowledge graph for artificial perfusion experiment data.

FIG. 4 is a flow diagram of an example process for generating a response to a user query using a knowledge graph for artificial perfusion experiment data. For convenience, the process 400 will be described as being performed by a system of one or more computers located in one or more locations. For example, a virtual brain system, e.g., the virtual system 102 of FIG. 1, appropriately programmed in accordance with this specification, can perform the process 400.

The knowledge graph can represent experimental data collected from perfusion experiments of a set of mammalian brains. The system can include a graph neural network that can process data represented within the knowledge graph to generate the response to the user query.

The system receives the user query (402). As described above, the query can be a request to perform a prediction task. The system can receive the user query from any of a variety of sources. For example, the system can receive the user query from a user by a user interface (e.g., a graphical user interface) of the system. As another example, the system can receive the user query from a user by an application programming interface (API) of the system.

In some implementations, the system can identify data within the knowledge graph relevant to generating the response to the user query (step 404). For example, the system can identify a sub-graph of the knowledge graph that is relevant to the user query, as described in more detail below with reference to FIG. 5.

In some implementations, the system can generate (e.g., instantiate) a query-specific graph based on the user query (step 406). The query-specific graph can be a sub-graph of the knowledge graph (e.g., as identified by the system to be relevant to the user query). The system can process the knowledge graph to generate the query-specific graph (e.g., by determining predictive features to include within the query-specific graph based on the knowledge graph).

The system processes data represented by the knowledge graph to generate the response to the user query (step 408). For example, when the system identifies a sub-graph of the knowledge graph relevant to the user query, the system can process the identified sub-graph to generate the response to the user query, as described below with reference to FIG. 5. As another example, the system can perform a prediction task based on the user query and include results from the prediction task within the response to the user query, as described in more detail below with reference to FIG. 6. As a further example, when the user query identifies a disease, the system can identify a combination of drugs predicted to counteract the disease, as described in more detail below with reference to FIG. 9. As another example, when the user query represents a request to determine a set of experimental parameters for a perfusion experiment on a mammalian brain, the system can, as a response to the query, determine the set of experimental parameters and can perform the perfusion experiment on the mammalian brain using the determined set of experimental parameters, as described in more detail below with reference to FIG. 10.

Figure 5:
FIG. 5 is a flow diagram of an example process for identifying and processing a relevant sub-graph to generate a response to a user query.
Figure 5:
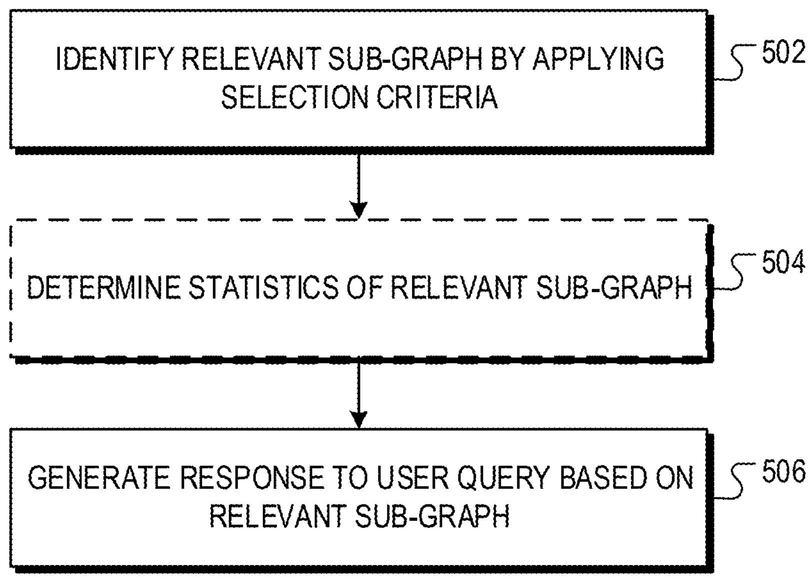

FIG. 5 is a flow diagram of an example process for identifying and processing a relevant sub-graph to generate a response to a user query. For convenience, the process 500 will be described as being performed by a system of one or more computers located in one or more locations. For example, a virtual brain system, e.g., the virtual system 102 of FIG. 1, appropriately programmed in accordance with this specification, can perform the process 500.

The system can identify the relevant sub-graph by applying a set of selection criteria to a knowledge graph of artificial perfusion experiment data (step 502). In particular, the selection criteria can classify nodes and edges of the knowledge graph as being relevant to the user query, and the system can identify the relevant sub-graph by determining nodes and edges from the knowledge graph that satisfy the set of selection criteria.

The system can use any of a variety of selection criteria to identify the relevant sub-graph. For example, the selection criteria can specify node types, and the system can identify the sub-graph by including or excluding node types from the knowledge graph (e.g., by including or excluding nodes associated with disease data, nodes associated with drug data, nodes associated with experimental data, etc.). As another example, the selection criteria can specify node properties, and the system can identify the sub-graph by including or excluding nodes with the specified properties from the knowledge graph (e.g., by including or excluding nodes associated with a specified disease, with a specified mammalian brain, with a specified experiment, etc.). As another example, the selection criteria can specify edge types and a connection depth, and the system can identify the sub-graph by identifying root nodes from the knowledge graph and including nodes from the knowledge graph having path lengths to one or more of the root nodes (e.g., as determined based on edges of the specified edge types) less than the specified connection depth.

The set of selection criteria can include any of a variety of criteria. For example, the set of selection criteria can include pre-determined selection criteria. As another example, the set of selection criteria can include criteria determined based on the user query. The user query can specify a query type, and the selection criteria can include criteria for the specified query type. As another example, the user query can specify criteria, and the selection criteria can include the criteria specified by the user query.

In some implementations, the system can determine a variety of statistics of the identified sub-graph of the knowledge graph (step 504). For example, the system can determine a number of edges connected to each node within the identified sub-graph. As another example, the system can determine, e.g., a mean, a variance, etc., of the numbers of edges connected to the nodes within the identified sub-graph. As another example, the system can identify root nodes for the sub-graph and can determine path-lengths between the root nodes and each node of the identified sub-graph.

The system can then generate a response to the user query by processing the identified relevant sub-graph (step 506). In particular, the system can include data characterizing the identified sub-graph within the response to the user query.

For example, the system can include data within the response identifying some or all of the nodes included in the identified sub-graph. As another example, when the system determines statistics of the identified sub-graph, the system can include the determined statistics of the identified sub-graph within the response. As another example, the system can generate the response based in part on the determined statistics of the identified sub-graph. For example, when the system determines a number of edges connected to each node within the identified sub-graph, the system can include within the response data identifying each node in the identified sub-graph that is connected to less than a threshold (e.g., a pre-determined threshold, a threshold specified by the user query, etc.) number of edges.

The system can further process the identified sub-graph, e.g., using a graph neural network, and can generate the response based at least in part on results from processing the sub-graph. An example process for processing graph data using a graph neural network to perform a prediction task is described in more detail below with reference to FIG. 6.

Figure 6:
FIG. 6 is a flow diagram of an example process for performing a prediction task by processing a knowledge graph of artificial perfusion experiment data using a graph neural network.
Figure 6:
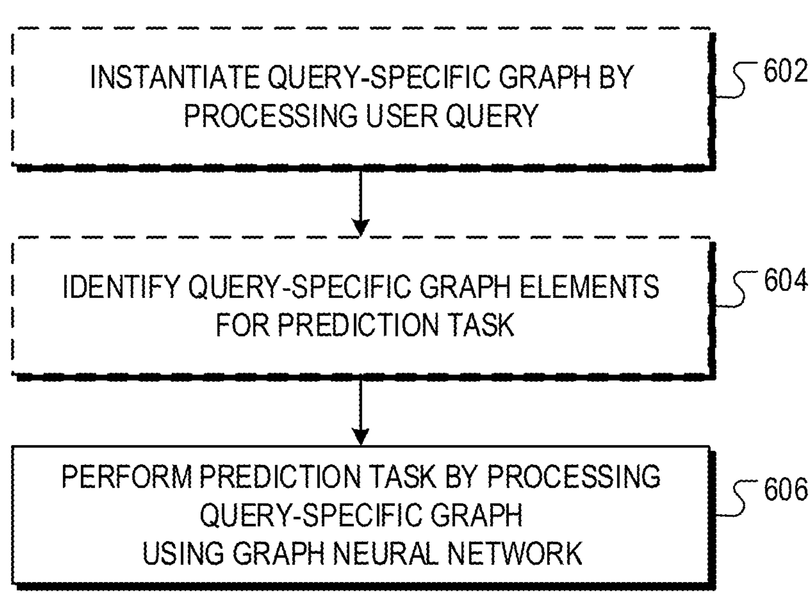

FIG. 6 is a flow diagram of an example process for performing a prediction task by processing artificial perfusion experiment data from a knowledge graph using a graph neural network. For convenience, the process 600 will be described as being performed by a system of one or more computers located in one or more locations. For example, a virtual brain system, e.g., the virtual system 102 of FIG. 1, appropriately programmed in accordance with this specification, can perform the process 600.

In general, the system can perform the prediction task by using the graph neural network to process a query-specific graph that includes data from the knowledge graph of perfusion experiment data relevant to generating a response to a user query.

As an example, the system can identify a sub-graph of the knowledge graph (e.g., a sub-graph relevant to performing the prediction task and responding to the user query) as described above with reference to FIG. 5 and can use the identified sub-graph as the query-specific graph.

The system can use the graph neural network to perform any of a variety of prediction tasks. For example, the prediction task can include generating a predicted likelihood that a drug will penetrate a blood-brain barrier in a mammalian brain. As another example, the prediction task can include generating predicted concentrations of a drug in a region of a mammalian brain for a sequence of time points following administration of the drug to the mammalian brain. As another example, the prediction task can include predicting a likelihood that a drug, when administered to a mammalian brain, will engage will interact with an intended target in the mammalian brain. As another example, the prediction task can include predicting a likelihood that a mammalian brain will become infected within a threshold duration of time during which the mammalian brain is artificially perfused using the electromechanical perfusion device. As another example, the prediction task can include predicting causal relationships among elements of experimental data (e.g., causal relationships between drug concentrations, phenotype presences, gene presences, disease presences, molecule concentrations, infectious agent concentrations, brain states, and so on). As another example, the prediction task can be to determine a set of experimental parameters to perform a perfusion experiment on a mammalian brain.

As described above with reference to FIG. 2, the graph neural network can be trained to perform the prediction task using training data from portions of the knowledge graph. The graph neural network can be trained to perform the prediction task using any appropriate machine learning technique.

In some implementations, the system can instantiate the query-specific graph based on the user query (step 602). In particular, the system can include query-specific nodes and edges with query specific features for performing the prediction task. As an example, when the prediction task involves predicting an interaction between a drug and a mammalian brain, the system can instantiate the query-specific graph to include a node representing the drug with node features characterizing the drug. As another example, when the prediction task involves predicting diseases for a mammalian brain, the system can instantiate the query-specific graph to include nodes that represent respective diseases with node features characterizing the respective diseases. As another example, when the prediction task involves predicting causal relationships among elements of experimental data (e.g., causal relationships between drug concentrations, phenotype presences, gene presences, disease presences, molecule concentrations, infectious agent concentrations, brain states, and so on), the system can instantiate the query-specific graph to include nodes that represent respective elements of experimental data with node features characterizing the respective elements of experimental data, e.g., to obtain particular experimental data characterizing the mammalian brain, to determine a particular causal relationship, and so on.

In some implementations, the system can identify query-specific graph elements for performing the prediction task (step 604). In particular, the system can identify query-specific graph elements for which predicting values for the query-specific values is equivalent to performing the prediction task. For example, the system can identify a query-specific pair of nodes in the query-specific graph such that performing the prediction task is equivalent to predicting a likelihood that the query-specific pair of nodes should be connected by an edge in the query-specific graph. As another example, the system can identify a query-specific node in the query-specific graph so that performing the prediction task is equivalent to predicting a set of one or more features associated with the query-specific node in the query-specific graph.

The system can perform the prediction task by processing the query-specific graph using the graph neural network (step 606). For example, when the system identifies a query-specific pair of nodes in the query-specific graph for the prediction task, the system can perform the prediction task by using the graph neural network to generate a predicted likelihood that the query-specific pair of nodes should be connected by an edge in the query-specific graph. As another example, when the system identifies a query-specific node in the query-specific graph and node features for the prediction task, the system can perform the prediction task by using the graph neural network to generate a predicted set of one or more features associated with the query-specific node in the query-specific graph. An example process of predicting graph features for the query-specific graph to perform the prediction task is described in more detail below with reference to FIG. 7. An example process for training the graph neural network to perform the prediction task by predicting graph features query-specific graphs is described in more detail below with reference to FIG. 8.

The query-specific graph can include data for any combination of multi-modal data types represented by the knowledge graph of the system. To enable the graph neural network to continue to perform the prediction task when data is added to the knowledge graph as more artificial perfusion experiments are performed or new data modalities are captured, the query-specific graph can include common node and edge embeddings for all data modalities within the knowledge graph. In particular, the node embeddings for all nodes in the query-specific graph can be fixed sized embeddings within a same node embedding space and the edge embeddings for all edges in the query-specific graph can be fixed sized embeddings within a same edge embedding space.

The system can include results from the prediction task as part of a response to the user query. For example, when the prediction task includes predicting interactions between a particular drug and mammalian brains, the system can determine, based at least in part on a result of the prediction task, that the drug should be administered to a subject (e.g., a subject characterized by the user query). As another example, when the prediction task includes predicting a likelihood that a mammalian brain will become infected within a threshold duration of time during which the mammalian brain is artificially perfused using the electromechanical perfusion device, the system can determine, based at least in part on a result of the prediction task, that one or more actions (e.g., administering antibiotics to the mammalian brain) should be performed to reduce a likelihood of infection in the mammalian brain.

Figure 7:
FIG. 7 is a flow diagram of an example process of predicting graph features of an input graph using a graph neural network to perform a prediction task.
Figure 7:
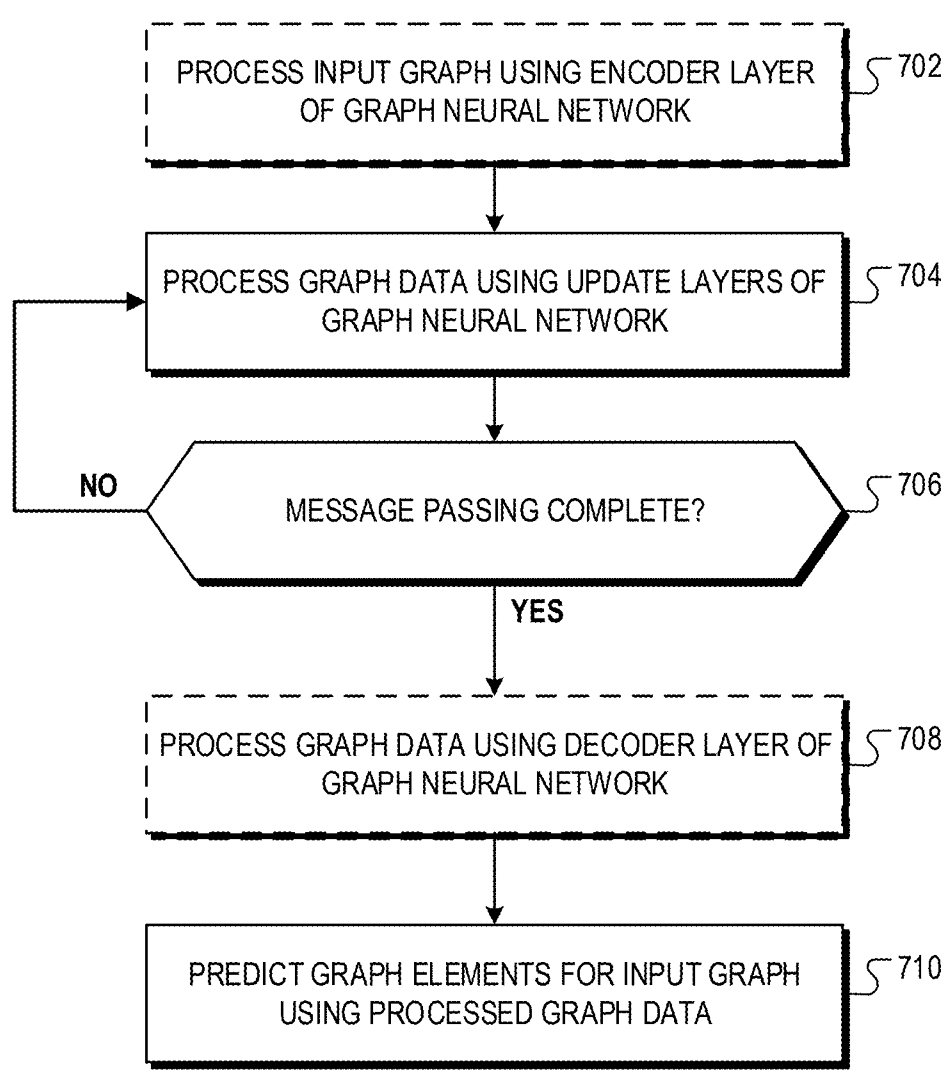

FIG. 7 is a flow diagram of an example process of predicting graph features of an input graph using a graph neural network to perform a prediction task. For convenience, the process 700 will be described as being performed by a system of one or more computers located in one or more locations. For example, a virtual brain system, e.g., the virtual system 102 of FIG. 1, appropriately programmed in accordance with this specification, can perform the process 700.

The graph neural network can include one or more message passing layers configured to determine graph updates to perform message passing on the input graph. For example, for each node of the input graph, the message passing layers of the graph neural network can be configured to determine updated node embeddings for the node based on the embeddings of the nodes and edges connected to the node.

In some implementations, the graph neural network can include an encoder layer configured to process the input graph before the sequence of message passing operations and generate graph features for use in the message passing operations. For example, for each node of the input graph, the encoder layer can generate an initial node embedding for the node to perform the prediction task. As another example, for each edge of the input graph, the encoder layer can generate an initial edge embedding for the edge to perform the prediction task. In some implementations, the graph neural network can include a decoder layer configured to process the input graph after the sequence of message passing operations to generate the predicted graph features for the prediction task.

When the graph neural network includes an encoder layer, the graph neural network can process the input graph using the encoder layer (step 702). As described above, the encoder layer can generate initial graph features (e.g., node embeddings, edge embeddings, etc.) for the message passing operations.

The graph neural network can then update the input graph over a sequence of update iterations (steps 704 and 706).

For each update iteration, the graph neural network can process graph data from the input graph using the message passing layers to update node and edge embeddings within the input graph (step 704). In particular, the graph neural network can perform a message passing operation for the update iteration by updating the embedding for each node in the input graph based on the embeddings of the neighboring nodes in the input graph.

The system can determine whether message passing is complete (step 706). In particular, the system can determine that message passing is complete after a pre-determined number of update iterations. If the system determines that the message passing is not complete, the system can proceed to a next update iteration (e.g., return to step 704 for the next update iteration).

When the graph neural network includes decoder layer, the graph neural network can process the updated input graph using the decoder layer (step 708). As described above, the decoder layer can generate predicted graph elements (e.g., predicted node embeddings, predicted edge embeddings, etc.) for the prediction task.

The graph neural network can then predict graph elements for the input graph in order to perform the prediction task (step 710). For example, the prediction task can include determining a predicted likelihood that a particular pair of nodes in the input graph should be connected by an edge. In this example, the system can generate the predicted likelihood for the edge, e.g., by determining a measure of similarity between respective node embeddings of the nodes that would be connected by the edge, or by processing an edge embedding for the edge as updated by the message passing operations. As another example, the prediction task can include predicting node features for a particular node, and the graph neural network generate the predicted node features for the node based on a node embedding for the node as updated by the message passing operations. (The system can instantiate some or all of the node features for the node at step 702 as having default or masked values, e.g., the value 0 or −1).

Figure 8:
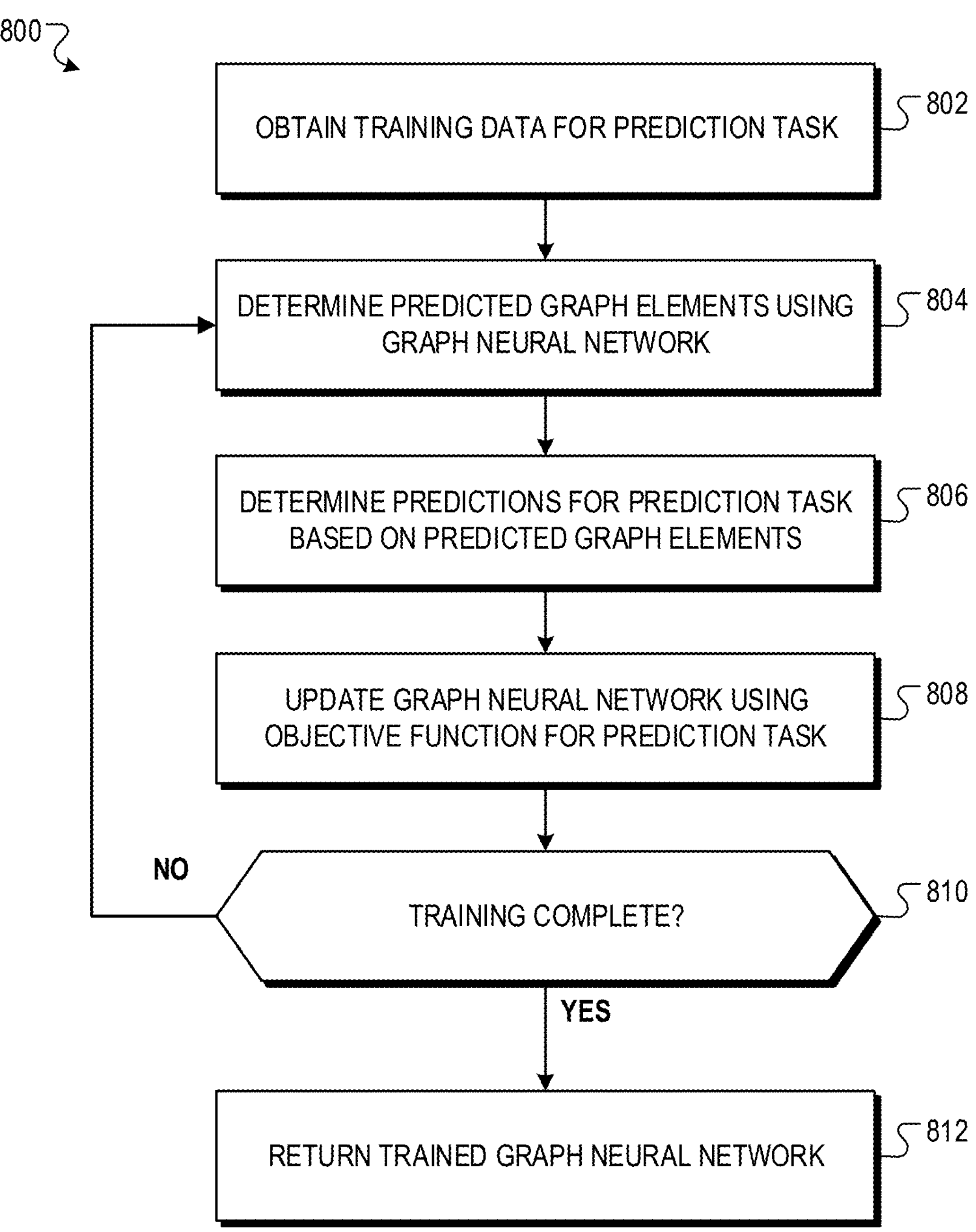
FIG. 8 is a flow diagram of an example process of training a graph neural network to perform a prediction task by predicting graph features.

FIG. 8 is a flow diagram of an example process of training a graph neural network to perform a prediction task by predicting graph features. For convenience, the process 800 will be described as being performed by a system of one or more computers located in one or more locations. For example, a virtual brain system, e.g., the virtual system 102 of FIG. 1, appropriately programmed in accordance with this specification, can perform the process 800.

The system can obtain training data for the prediction task that includes example input graphs and corresponding target predictions (step 802). In particular, the system can obtain training data for the prediction task based on a knowledge graph stored by the system. For example, each training example can include an example graph that includes data from the knowledge graph for a particular brain or artificial perfusion experiment and a target prediction (e.g., as determined by a ground truth value for the prediction as stored within the knowledge graph) for the particular brain or artificial perfusion experiment.

The system can train the graph neural network over a sequence of training iterations.

At each training iteration, the system can process example input graphs from the training data using the graph neural network to predict graph elements for the input graphs (step 804). An example process of predicting graph elements using the graph neural network is described in more detail above with reference to FIG. 7.

The system can then determine predictions for the prediction task based on predicted graph elements (step 806). For example, the prediction task can include determining a predicted likelihood that a particular pair of nodes should be connected by an edge, and system can determine the predicted likelihoods for the edge based on edge embeddings for the edge as predicted by the graph neural network processing the example input graphs. As another example, the prediction task can include predicting node features for a particular node, and the system can determine the predicted node features for the node based on node embeddings for the node as predicted by the graph neural network processing the example input graphs.

The system can then update the graph neural network using an objective function for the prediction task that measures an error between the predictions generated by the graph neural network processing the example input graphs and corresponding target predictions from the training data (step 808). The system can use any appropriate machine learning technique to update the graph neural network. As an example, the system can determine a gradient of the objective function and can update the graph neural network following, e.g., stochastic gradient descent, ADAM, and so on. The objective function may be any appropriate objective function for the prediction task (e.g., mean squared error, cross-entropy loss, etc.).

The system can determine whether training is complete (step 810). The system can determine whether training is complete based on any of a variety of criteria. For example, the system can determine that training is complete after a pre-determined number of training iterations. As another example, the system can determine that training is complete when the error for the training iteration measured by the objective function falls below a pre-defined threshold value. As another example, the system can determine that training is complete when a difference between the error for the current training iteration and the error for a previous training iteration falls below a pre-defined threshold value. If the system determines that the training is not complete, the system can proceed to a next training iteration (e.g., return to step 804 for the next training iteration).

When the system determines that training is complete, the system can return the trained graph neural network (step 812).

Figure 9:
FIG. 9 is a flow diagram of an example process for processing a knowledge graph of artificial perfusion experiment data to identify a combination of drugs predicted to counteract a disease identified by a user query.
Figure 9:
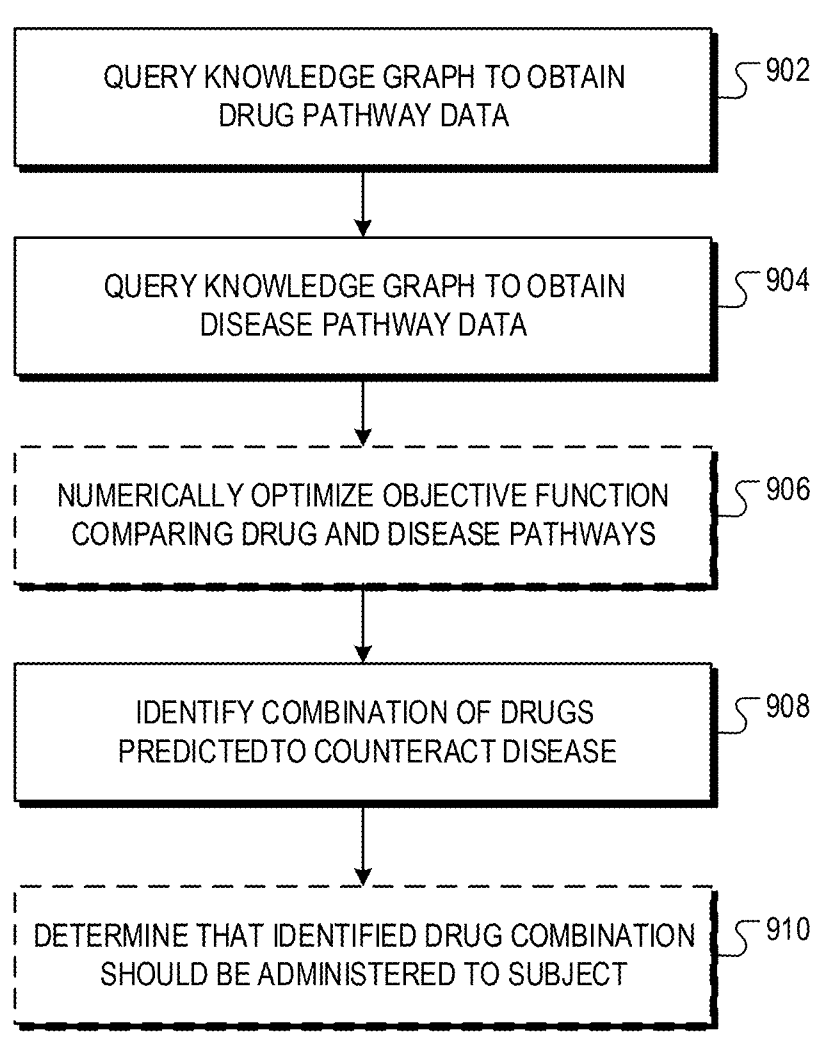

FIG. 9 is a flow diagram of an example process for processing a knowledge graph of artificial perfusion experiment data to identify a combination of drugs predicted to counteract a disease identified by a user query. For convenience, the process 900 will be described as being performed by a system of one or more computers located in one or more locations. For example, a virtual brain system, e.g., the virtual system 102 of FIG. 1, appropriately programmed in accordance with this specification, can perform the process 900.

The system can query the knowledge graph to obtain drug pathway data for a collection of drugs (step 902). In particular, the system can query the knowledge graph to obtain, for each of the collection of drugs, drug pathway data characterizing a change in biochemical state of a mammalian brain resulting from administering the drug to the mammalian brain while the mammalian brain is artificially perfused by the electromechanical perfusion device.

The drug pathway data for a drug can characterize a variety of changes resulting from administering the drug to a mammalian brain. For example, the drug pathway data for a drug can include numerical values representing blood concentrations of the drug over time resulting from administering the drug. As another example, the drug pathway data for a drug can include numerical values representing, e.g., concentrations of metabolites from a metabolic pathway of the drug within the brain, activation or a deactivation of gene pathways in the brain, physiological changes to the brain (e.g., swelling, tissue damage, etc.), etc., resulting from administering the drug.

As an example, the drug pathway data for a particular drug can be based on a sub-graph of the knowledge graph that includes data characterizing the particular drug, obtained as described above with reference to FIG. 5. As a further example, the drug pathway data for the particular drug can include predictions obtained by processing the sub-graph for the particular drug using a graph neural network trained to predict changes in biochemical state of a mammalian brain resulting from administering the particular drug to the mammalian brain, as described above with reference to FIG. 6.

The system can query the knowledge graph to obtain disease pathway data characterizing a change in biochemical state of a mammalian brain resulting from the disease (step 904). The disease pathway data can characterize differences between brains with and without the disease, e.g., as obtained by calculating a difference between artificial perfusion experiment data obtained for brains with and without the disease. As an example, the disease pathway data for the disease can be based on a sub-graph of the knowledge graph that includes data characterizing the disease, obtained as described above with reference to FIG. 5. As a further example, the disease pathway data for the disease can include predictions obtained by processing the sub-graph for the particular drug using a graph neural network trained to predict changes in biochemical state of a mammalian brain resulting from the disease, as described above with reference to FIG. 6.

In some implementations, the system can perform a numerical optimization, over a space of combinations of drugs from the collection of drugs, to optimize an objective function that compares the disease pathway and combined drug pathways resulting from combinations of drugs (step 906). In particular, the system can perform a numerical optimization, over a space of combinations of drugs from the collection of drugs, to optimize an objective function that measures, for each combination of drugs, a difference between: (i) the disease pathway, and (ii) a combined drug pathway resulting from combining the drug pathway of each drug in the combination of drugs. For example, the objective function can measure a norm (e.g., an L1 norm, an L2 norm, etc.) of the difference between the disease pathway and the combined drug pathway.

Combinations of drugs that include many different drugs may be impractical compared to combinations of drugs that include fewer drugs. In order to limit the number of different drugs within the optimized combination, the objective function can include a sparsity inducing term (e.g., an L0 norm) that penalizes combinations of drugs based on the number of included drugs.

As an example, the combined drug pathway can be a linear combination of the drug pathways (e.g., as scaled by a respective linear scaling coefficient) for each of the combination of drugs. When the combined drug pathway is a linear combination of drug pathways for each of the combination of drugs, the system can numerically optimize the linear scaling coefficients for the combined drug pathway in order to optimize the objective function.

The system can identify a combination of drugs predicted to counteract the disease using the drug pathway data and the disease pathway data (step 908). For example, when the system performs a numerical optimization of the objective function comparing the disease pathway with combined drug pathways resulting from combinations of drugs, the system can determine the combination of drugs predicted to counteract the disease based on a result of the numerical optimization. As a further example, the system can identify the combination of drugs that most optimizes the objective function as the combination of drugs predicted to counteract the disease.

In particular, the system can use the results of the numerical optimization to determine a composition of the combination of drugs predicted to counteract the disease. For example, when the system numerically optimizes linear scaling coefficients for the combined drug pathway, the system can identify drugs associated with non-zero linear scaling coefficients as the drugs included within the combination of drugs predicted to counteract the disease. As another example, when the system numerically optimizes linear scaling coefficients for the combined drug pathway, the system can use the linear scaling coefficients to determine relative proportions of the drugs included within the combination of drugs predicted to counteract the disease.

In some implementations, the system can determine whether the identified combination of drugs should be administered to a subject having the disease (step 910). In particular, the user query can characterize the subject having the disease, and the system can include within the response to the user query an indication of (i) the identified combination of drugs predicted to counteract the disease and (ii) whether the identified combination of drugs should be administered to the subject having the disease.

Figure 10:
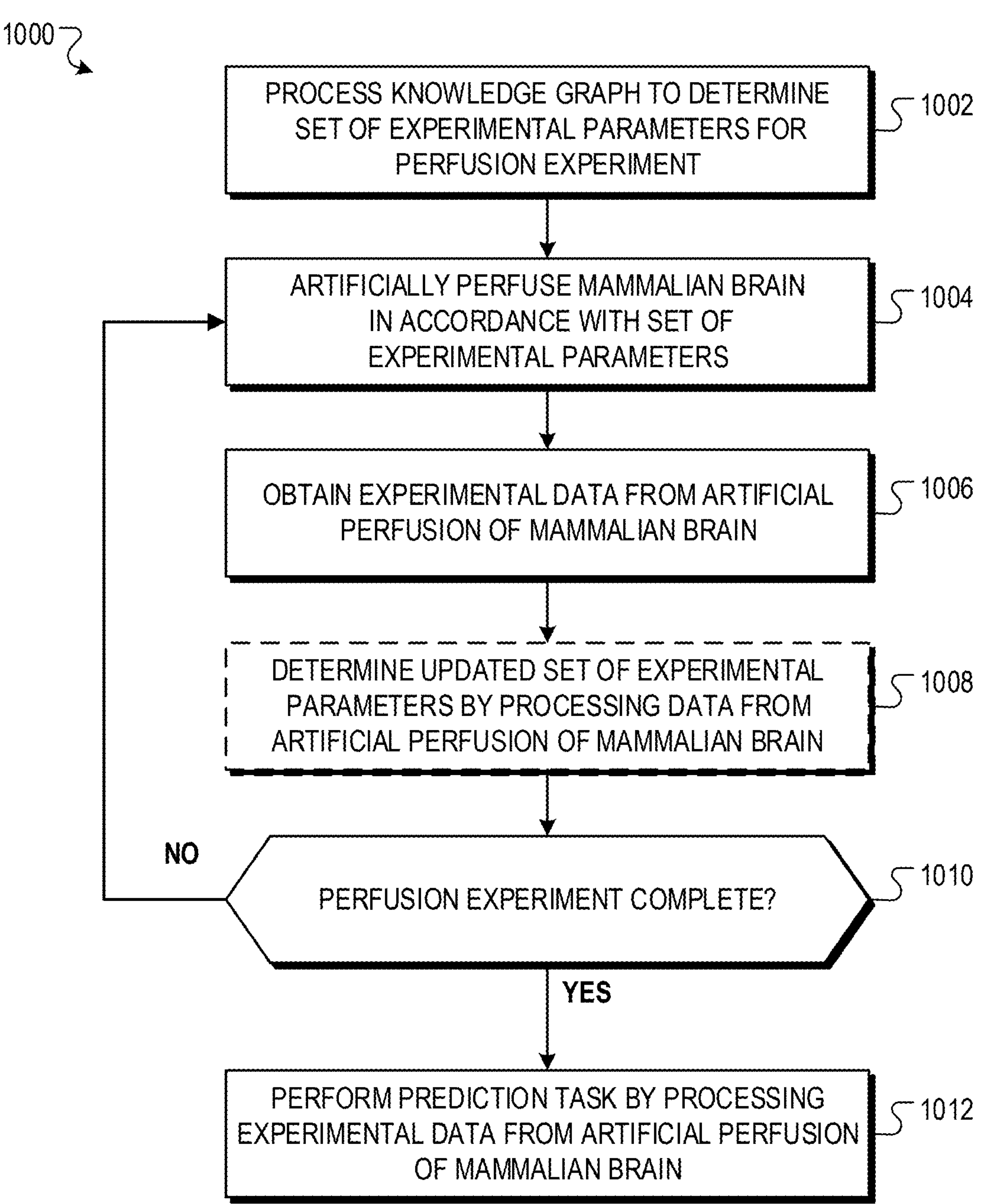
FIG. 10 is a flow diagram of an example process for performing a perfusion experiment with a mammalian brain using experimental parameters for the mammalian brain determined by processing a knowledge graph.

FIG. 10 is a flow diagram of an example process for performing a perfusion experiment on a mammalian brain using experimental parameters for the mammalian brain determined by processing a knowledge graph. For convenience, the process 1000 will be described as being performed by a system of one or more computers located in one or more locations. For example, a virtual brain system, e.g., the virtual system 102 of FIG. 1, appropriately programmed in accordance with this specification, can perform the process 1000.

The system can process the knowledge graph to determine the set of experimental parameters for the perfusion experiment on the mammalian brain (step 1002). In particular, the system can process a knowledge graph (e.g., the knowledge graph 208 described above with reference to FIG. 2) that jointly represents multi-modal experimental data characterizing a plurality of mammalian brains to determine the set of experimental parameters for the perfusion experiment. For example, the system can process the knowledge graph following the process 500 described above with reference to FIG. 5 to determine the set of experimental parameters for the perfusion experiment.

In some implementations, the system can obtain a query (e.g., a query received from a user) that represents a request to determine the set of experimental parameters for the perfusion experiment and can determine the set of experimental parameters for the perfusion experiment as a response to the query based at least in part on the knowledge graph. As a further example, the system can determine the set of experimental parameters for the perfusion experiment on the mammalian brain as a response to the query following the process 400 as described above with reference to FIG. 4. For example, the query can be a request to determine experimental parameters in order to obtain particular experimental data characterizing the mammalian brain, and the system can process the knowledge graph to determine the set of experimental parameters as appropriate for performing the perfusion experiment to obtain the particular experimental data. As another example, the query can be a request to determine experimental parameters in order to determine a particular causal relationship, and the system can process the knowledge graph to determine the set of experimental parameters as appropriate for performing the perfusion experiment to determine the particular causal relationship.

The set of experimental parameters for the perfusion experiment specify any of a variety of parameters for controlling the perfusion experiment. In particular, the set of experimental parameters for the perfusion experiment can specify how parameters for controlling the perfusion experiment should vary during the perfusion experiment. For example, the set of experimental parameters can specify temperatures, pressures, flow rates, oxygen saturations, etc., of a perfusate during the perfusion experiment. As another example, the set of experimental parameters can specify quantities of substances (e.g., electrolytes, proteins, metabolites, enzymes, hormones, lipids, nutrients, gases, infectious agents, drugs, etc.) within the perfusate during the perfusion experiment.

The system can then perform the perfusion experiment on the mammalian brain to obtain multi-modal experimental data that characterizes the mammalian brain. In particular, as part of performing the perfusion experiment, the system can perform a sequence of one or more experimental steps, e.g., performing steps 1004 through 1010 at each experimental step of the perfusion experiment.

The system can artificially perfuse the mammalian brain using an electromechanical perfusion device (e.g., the perfusion device 116 described above with reference to FIG. 1) in accordance with the set of experimental parameters for the perfusion experiment (step 1004). In particular, the system can transmit the set of experimental parameters to the electromechanical perfusion device (e.g., using a wired connection, a data communications network, etc.)

The system can obtain multi-modal data that characterizes a state of the mammalian brain from the artificial perfusion of the mammalian brain by the electromechanical perfusion device (step 1006). For example, during the artificial perfusion of the mammalian brain, the system can receive multi-modal data that characterizes states of the mammalian brain during the artificial perfusion as transmitted to the system by the electromechanical perfusion device (e.g., using a wired connection, a data communications network, etc.). As another example, after the artificial perfusion of the mammalian brain, the system can the system can obtain multi-modal data that characterizes states of the mammalian brain, e.g., throughout the artificial perfusion, after the artificial perfusion, and so on.

The system can update the knowledge graph to include some or all of the obtained multi-modal data characterizing the state of the mammalian brain. For example, in some implementations, the system can update the knowledge graph during the artificial perfusion of the mammalian brain as the system obtains the multi-modal data characterizing the state of the mammalian brain from the artificial perfusion.

In some implementations, the system can determine an updated set of experimental parameters for the mammalian brain (step 1008). In particular, the system can determine the updated set of experimental parameters for the mammalian brain by processing: (i) the knowledge graph and (ii) multi-modal data that characterizes the state of the mammalian brain during the artificial perfusion of the mammalian brain by the electromechanical perfusion device. For example, when the system updates the knowledge graph to include the multi-modal data that characterizes the state of the mammalian brain during the artificial perfusion of the mammalian brain the system can determine the updated set of experimental parameters for the perfusion experiment on the mammalian brain by processing the updated knowledge graph (e.g., following the process 500 as described above with reference to FIG. 5).

By updating the set of experimental parameters, the system can monitor and respond to changes in the mammalian brain over the course of the perfusion experiment. For example, the system can update the set of experimental parameters to, e.g., maintain certain drug concentrations within the mammalian brain, molecule concentrations within the mammalian brain, infectious agent concentrations within the mammalian brain, reduce swelling within the mammalian brain, and so on.

The system can determine whether the perfusion experiment is complete (step 1010). The system can determine whether the perfusion experiment is complete based on any of a variety of criteria. For example, the system can determine that training is complete after a pre-determined number of experimental steps. As another example, the system can determine that training is complete after a pre-determined length of time. As another example, the system can determine that training is complete based on experimental data collected during the experimental step. If the system determines that the perfusion experiment is not complete, the system can proceed to a next experimental step (e.g., return to step 1004 for the next experimental step). When the system determines an updated set of experimental parameters, the system can artificially perfuse the mammalian brain using the updated set of experimental parameters during the next experimental step.

After the perfusion experiment is complete, the system can process the multi-modal experimental data for the mammalian brain obtained during the perfusion experiment to perform a prediction task (step 1012). In particular, when the system updates the knowledge graph to include some or all of the multi-modal experimental data for the mammalian brain obtained during the perfusion experiment, the system can process the updated knowledge graph to perform the prediction task. For example, the system can receive a user query representing a request to perform the prediction task and can perform the prediction task following the process 400 described above with reference to FIG. 4.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, comprising:

obtaining, for each of a plurality of mammalian brains, respective multi-modal experimental data that characterizes the mammalian brain and that is derived from a respective experiment involving:

(i) artificially perfusing the mammalian brain by an electromechanical perfusion device, and (ii) obtaining multi-modal data that characterizes a state of the mammalian brain during or after the artificial perfusion of the mammalian brain by the electromechanical perfusion device;

processing the multi-modal experimental data to generate a knowledge graph that jointly represents the multi-modal experimental data characterizing the plurality of mammalian brains, wherein:

the knowledge graph comprises a set of nodes and a set of edges;

the set of nodes comprises a plurality of nodes that each represent elements of the multi-modal experimental data; and each edge connects a respective pair of nodes and represents a relationship between the respective pair of nodes;

receiving a query from a user that represents a request to perform a prediction task relating to a mammalian brain; and generating a response to the query based at least in part on the knowledge graph by performing operations comprising:

instantiating a query-specific graph based on the query, wherein the query-specific graph comprises at least a subset of the knowledge graph that is relevant to performing the prediction task relating to the mammalian brain and includes one or more of the plurality of nodes representing elements of the of the multi-modal experimental data;

processing the query-specific graph using a graph neural network to generate, by the graph neural network and based on the multi-modal experimental data represented by the query-specific graph, an output prediction for the prediction task relating to the mammalian brain, comprising:

generating, by an encoder layer of the graph neural network, a respective node embedding of each node, wherein the node embeddings represent multi-modal data experimental brain perfusion data associated with the nodes in a common node embedding space; and iteratively updating the node embeddings by a plurality of message passing layers of the graph neural network; and generating the response to the query based on the output prediction for the prediction task relating to the mammalian brain generated by the graph neural network;

wherein the prediction task includes predicting a likelihood that a target mammalian brain will undergo an infection, swelling, or tissue damage within a threshold duration of time during which the target mammalian brain is artificially perfused using the electromechanical perfusion device;

wherein the prediction task is performed in real time during perfusion of the target mammalian brain by the electromechanical perfusion device based at least in part on measured characteristics of the target mammalian brain which are dynamically incorporated in the knowledge graph during the perfusion of the target mammalian brain.

2. The method of claim 1, wherein the set of nodes of the knowledge graph comprises one or more nodes that each represent data that characterizes, for each time point in a sequence of one or more time points during artificial perfusion of a respective mammalian brain, a sample from: (i)

an arterial input to the mammalian brain at the time point, or (ii) a venous output from the mammalian brain at the time point.

3. The method of claim 2, wherein for each time point in the sequence of time points, the data characterizing the sample from: (i) the arterial input to the mammalian brain at the time point, or (ii) the venous output from the mammalian brain at the time point, characterizes a respective concentration of each of one or more substances in the sample at the time point.

4. The method of claim 3, wherein the one or more substances comprise one or more of: electrolytes, proteins, metabolites, enzymes, hormones, lipids, nutrients, gases, infectious agents, or drugs.

5. The method of claim 1, wherein the set of nodes of the knowledge graph comprises one or more nodes that each represent data that characterizes, for each time point in a sequence of timepoints during artificial perfusion of a respective mammalian brain, a tissue sample extracted from a respective region of the mammalian brain at the time point.

6. The method of claim 5, wherein for each time point in the sequence of time points, the data characterizing the tissue sample extracted from the respective region of the mammalian brain at the time point comprises:

imaging data generated by imaging the tissue sample using one or more imaging modalities.

7. The method of claim 1, wherein the set of nodes of the knowledge graph comprises one or more nodes that each represent data that characterizes a respective concentration of a respective substance in a respective region of a respective mammalian brain at the time point.

8. The method of claim 1, wherein the set of nodes of the knowledge graph comprises one or more nodes that each represent time series data that characterizes a respective concentration of a respective substance in a respective region of a respective mammalian brain over a sequence of time points.

9. The method of claim 8, wherein the substance is: an electrolyte, or a protein, or a metabolite, or an enzyme, or a hormone, or a lipid, or a nutrient, or a gas, or an infectious agent, or a drug.

10. The method of claim 1, wherein:

the knowledge graph comprises a causal graph;

the causal graph comprises a respective set of nodes and a respective set of directed edges;

the set of nodes of the causal graph comprises a plurality of nodes that each represent elements of the multi-modal experimental data; and each directed edge of the causal graph connects a respective pair of nodes of the causal graph and represents a causal relationship between the respective pair of nodes of the causal graph.

11. The method of claim 10, wherein generating the knowledge graph comprises generating the causal graph by performing operations comprising, for each of one or more pairs of nodes of the causal graph:

determining a correlation between the elements of the multi-modal experimental data represented by the pair of nodes of the causal graph; and generating a directed edge of the causal graph that connects the pair of nodes of the causal graph based on the correlation determined between the elements of the multi-modal experimental data represented by the pair of nodes of the causal graph.

12. The method of claim 10, wherein each directed edge of the causal graph characterizes a degree of correlation between the elements of the multi-modal experimental data represented by the pair of nodes of the causal graph connected by the edge of the causal graph.

13. The method of claim 1, wherein instantiating the query-specific graph based on the query comprises:

identifying a sub-graph of the knowledge graph that is relevant to performing the prediction task relating to the mammalian brain and that includes one or more of the plurality of nodes representing elements of the of the multi-modal experimental data; and instantiating the query-specific graph to include the identified sub-graph of the knowledge graph.

14. The method of claim 13, wherein identifying the sub-graph of the knowledge graph that is relevant to performing the prediction task relating to the mammalian brain and that includes one or more of the plurality of nodes representing elements of the of the multi-modal experimental data comprises:

determining that each node and edge in the knowledge graph that satisfies a set of criteria defined by the user query is included in the sub-graph.

15. The method of claim 13, wherein generating the response to the user query based on the output prediction for the prediction task relating to the mammalian brain comprises:

generating a response that identifies some or all of the nodes included in the identified sub-graph.

16. The method of claim 13, wherein generating the response to the user query based on the output prediction for the prediction task relating to the mammalian brain comprises:

determining one or more statistics of the identified sub-graph of the knowledge graph; and generating the response to the user query based on the statistics of the identified sub-graph of the knowledge graph.

17. The method of claim 16, wherein determining the one or more statistics of the identified sub-graph of the knowledge graph comprises:

determining, for each node included in the identified sub-graph, a number of edges connected to the node; and wherein generating the response to the user query based on the statistics of the identified sub-graph comprises:

generating a response to the user query that identifies each node in the identified sub-graph that is connected to less than a threshold number of edges.

18. The method of claim 1, wherein the graph neural network has been trained to perform one or more prediction tasks relating to mammalian brains on at least a portion of the knowledge graph.

19. A system comprising:

one or more computers; and one or more storage devices communicatively coupled to the one or more computers, wherein the one or more storage devices store instructions that, when executed by the one or more computers, cause the one or more computers to perform operations comprising:

obtaining, for each of a plurality of mammalian brains, respective multi-modal experimental data that characterizes the mammalian brain and that is derived from a respective experiment involving:

(i) artificially perfusing the mammalian brain by an electromechanical perfusion device, and (ii) obtaining multi-modal data that characterizes a state of the mammalian brain during or after the artificial perfusion of the mammalian brain by the electromechanical perfusion device;

processing the multi-modal experimental data to generate a knowledge graph that jointly represents the multi-modal experimental data characterizing the plurality of mammalian brains, wherein:

the knowledge graph comprises a set of nodes and a set of edges;

the set of nodes comprises a plurality of nodes that each represent elements of the multi-modal experimental data; and each edge connects a respective pair of nodes and represents a relationship between the respective pair of nodes;

receiving a query from a user that represents a request to perform a prediction task relating to a mammalian brain; and generating a response to the query based at least in part on the knowledge graph by performing operations comprising:

instantiating a query-specific graph based on the query, wherein the query-specific graph comprises at least a subset of the knowledge graph that is relevant to performing the prediction task relating to the mammalian brain and includes one or more of the plurality of nodes representing elements of the of the multi-modal experimental data;

processing the query-specific graph using a graph neural network to generate, by the graph neural network and based on the multi-modal experimental data represented by the query-specific graph, an output prediction for the prediction task relating to the mammalian brain, comprising:

generating, by an encoder layer of the graph neural network, a respective node embedding of each node, wherein the node embeddings represent multi-modal data experimental brain perfusion data associated with the nodes in a common node embedding space; and iteratively updating the node embeddings by a plurality of message passing layers of the graph neural network; and generating the response to the query based on the output prediction for the prediction task relating to the mammalian brain generated by the graph neural network;

wherein the prediction task includes predicting a likelihood that a target mammalian brain will undergo an infection, swelling, or tissue damage within a threshold duration of time during which the target mammalian brain is artificially perfused using the electromechanical perfusion device;

wherein the prediction task is performed in real time during perfusion of the target mammalian brain by the electromechanical perfusion device based at least in part on measured characteristics of the target mammalian brain which are dynamically incorporated in the knowledge graph during the perfusion of the target mammalian brain.

20. One or more non-transitory computer storage media storing instructions that when executed by one or more computers cause the one or more computers to perform operations comprising:

obtaining, for each of a plurality of mammalian brains, respective multi-modal experimental data that characterizes the mammalian brain and that is derived from a respective experiment involving:

(i) artificially perfusing the mammalian brain by an electromechanical perfusion device, and (ii) obtaining multi-modal data that characterizes a state of the mammalian brain during or after the artificial perfusion of the mammalian brain by the electromechanical perfusion device;

processing the multi-modal experimental data to generate a knowledge graph that jointly represents the multi-modal experimental data characterizing the plurality of mammalian brains, wherein:

the knowledge graph comprises a set of nodes and a set of edges;

the set of nodes comprises a plurality of nodes that each represent elements of the multi-modal experimental data; and each edge connects a respective pair of nodes and represents a relationship between the respective pair of nodes;

receiving a query from a user that represents a request to perform a prediction task relating to a mammalian brain; and generating a response to the query based at least in part on the knowledge graph by performing operations comprising:

instantiating a query-specific graph based on the query, wherein the query-specific graph comprises at least a subset of the knowledge graph that is relevant to performing the prediction task relating to the mammalian brain and includes one or more of the plurality of nodes representing elements of the of the multi-modal experimental data;

processing the query-specific graph using a graph neural network to generate, by the graph neural network and based on the multi-modal experimental data represented by the query-specific graph, an output prediction for the prediction task relating to the mammalian brain, comprising:

generating, by an encoder layer of the graph neural network, a respective node embedding of each node, wherein the node embeddings represent multi-modal data experimental brain perfusion data associated with the nodes in a common node embedding space; and iteratively updating the node embeddings by a plurality of message passing layers of the graph neural network; and generating the response to the query based on the output prediction for the prediction task relating to the mammalian brain generated by the graph neural network;

wherein the prediction task includes predicting a likelihood that a target mammalian brain will undergo an infection, swelling, or tissue damage within a threshold duration of time during which the target mammalian brain is artificially perfused using the electromechanical perfusion device;

wherein the prediction task is performed in real time during perfusion of the target mammalian brain by the electromechanical perfusion device based at least in part on measured characteristics of the target mammalian brain which are dynamically incorporated in the knowledge graph during the perfusion of the target mammalian brain.

* * * * *